(12) United States Patent
Wilen et al.

(10) Patent No.: US 8,893,966 B2
(45) Date of Patent: Nov. 25, 2014

(54) CUSTOMIZABLE INTERACTIVE GIFTING AND ADVERTISING SYSTEM AND METHOD

(71) Applicant: WILopEN Products, LC, Deerfield Beach, FL (US)

(72) Inventors: Richard Wilen, Boca Raton, FL (US); Gordon Kramer, Coral Springs, FL (US)

(73) Assignee: WILopEN Products LC, Deerfield Beach, FL (US)

( * ) Notice: Subject to any disclaimer, the term of this patent is extended or adjusted under 35 U.S.C. 154(b) by 0 days.

(21) Appl. No.: 14/071,834

(22) Filed: Nov. 5, 2013

(65) Prior Publication Data

US 2014/0081769 A1  Mar. 20, 2014

Related U.S. Application Data

(63) Continuation-in-part of application No. 11/351,658, filed on Feb. 10, 2006, now Pat. No. 8,602,297, and a continuation-in-part of application No. 12/464,740, filed on May 12, 2009, now Pat. No. 8,577,735.

(60) Provisional application No. 61/052,377, filed on May 12, 2008.

(51) Int. Cl.
| | |
|---|---|
| *G06K 5/00* | (2006.01) |
| *G06Q 30/06* | (2012.01) |
| *G06Q 30/02* | (2012.01) |
| *G07F 7/02* | (2006.01) |
| *G06Q 20/34* | (2012.01) |
| *G06Q 20/28* | (2012.01) |

(52) U.S. Cl.
CPC ............... *G06Q 20/28* (2013.01); *G06Q 30/06* (2013.01); *G06Q 30/02* (2013.01); *G07F 7/02* (2013.01); *G06Q 30/0269* (2013.01); *G06Q 20/3437* (2013.01)
USPC ............ 235/380; 235/375; 235/487; 235/488

(58) Field of Classification Search
USPC .................. 235/380, 375, 379, 486, 487, 488; 705/1, 29, 16, 39
See application file for complete search history.

(56) References Cited

U.S. PATENT DOCUMENTS

| | | | |
|---|---|---|---|
| 2003/0048888 A1 | 3/2003 | Hopper | |
| 2003/0177054 A1* | 9/2003 | Reinbold et al. | ................ 705/10 |
| 2004/0114766 A1* | 6/2004 | Hileman et al. | ............... 380/278 |

(Continued)

FOREIGN PATENT DOCUMENTS

WO    0070517    11/2000

*Primary Examiner* — Edwyn Labaze
(74) *Attorney, Agent, or Firm* — Johnson & Martin, PA; James David Johnson

(57) ABSTRACT

A method and system is provided for gifting using interactive multimedia and a gifting system. The gifting system can include a gift card, a website for redeeming the gift card, a plurality of gift representations corresponding to actual gift items, and means for advertising additional retail products or services to consumers. The gift card can also include a greeting card and a unique card identifier associated with the user. The gift card may be viewable through a window on the greeting card. The methods and systems can be used to advertise products to consumers, which can be purchased for personal use or for gifting. The system can be used to direct consumers to a card issuer's website. The gift card may be physical and/or virtual, and may be translated between physical and virtual forms.

14 Claims, 18 Drawing Sheets

(56) References Cited

U.S. PATENT DOCUMENTS

| | | | |
|---|---|---|---|
| 2006/0116960 A1* | 6/2006 | Gillin et al. | 705/40 |
| 2006/0196787 A1* | 9/2006 | Lewis | 206/232 |
| 2006/0200362 A1 | 9/2006 | Paciolla | |
| 2007/0257106 A1* | 11/2007 | Sarkany | 235/380 |
| 2012/0323787 A1* | 12/2012 | Nelsen | 705/44 |
| 2013/0117646 A1* | 5/2013 | Hansen et al. | 715/205 |

* cited by examiner

| PERSON |
|---|
| FIRST NAME |
| LAST NAME |
| EMAIL ADDRESS |

| ADDRESS |
|---|
| PERSONID |
| ADDRESS 1 |
| ADDRESS 2 |
| CITY |
| STATE |
| POSTAL CODE |
| COUNTRY CODE |

| FINANCIAL |
|---|
| PERSONID |
| ADDRESSID |
| CREDIT CARD NUMBER |
| CREDIT CARD EXPIRATION |
| CREDIT CARD TYPE |

| LOYALTY POINTS |
|---|
| PERSONID |
| LOYALTY POINTS |
| LOYALTY POINTS EARNED |
| LOYALTY POINTS REDEEMED |
| LOYALTY POINTS VALUE |

| GIFT |
|---|
| GIFT SKU |
| GIFT PRICE |
| GIFT INFORMATION |
| GIFT DESCRIPTION |

| OCCASSION |
|---|
| SENDER PERSONID |
| RECEIVER PERSONID |
| OCCASSION DESCRIPTION |
| OCCASSION DATE |

| SHIPPING |
|---|
| SENDER PERSONID |
| RECEIVER PERSONID |
| GIFTID |
| OCCASSIONID |
| SHIPPING DATE |

FIG. 8

CUSTOMIZABLE INTERACTIVE GIFTING AND ADVERTISING SYSTEM AND METHOD

CROSS-REFERENCE TO RELATED APPLICATION

This application is a continuation-in-part of and claims priority from U.S. patent application Ser. No. 11/351,658, filed on Feb. 10, 2006 and is a continuation-in-part of and claims priority to U.S. patent application Ser. No. 12/464,740, filed on May 12, 2009, which claims priority from U.S. provisional patent application Ser. No. 61/052,377, filed on May 12, 2008. All applications are hereby incorporated by reference into this application in their entirety.

FIELD OF THE INVENTION

The invention relates to methods and systems for gifting and advertising. More particularly, the invention relates to methods and systems for gifting to consumers utilizing gift cards, gifting systems and interactive multimedia and advertising via the same.

BACKGROUND

Traditionally, advertising to consumers has been accomplished using passive means in that advertisements have been strategically presented in printed publications, on billboards, and through radio, television and internet-based media with the hope that consumers would read, view, listen to, or otherwise pay attention to the advertisements. These types of passive advertising are generally ineffective in that the advertiser usually has no means for knowing which consumers have seen or heard the advertiser's advertisement. The inability to collect information concerning the identity of the consumer and how closely the consumer scrutinized or paid attention to the advertisement has limited the value of traditional advertising systems and methods. The potential of data mining to collect consumer information related to advertising viewing and listening habits is underutilized by conventional advertising.

Some advertisers, namely retailers and manufacturers, have created gift cards that have been sold or provided to consumers as a means for driving business to their stores, product lines, or services. In this sense, the advertisers have used gift cards as an advertising tool to promote their retail products, services, and locations. Conventional gift cards pose several problems and disadvantages both in terms of a means of advertising as well as in terms of security, convenience, and personalization.

From a security standpoint, conventional gift cards are often manufactured from plastic having a thickness that is easily perceived by touch when a plastic gift card is inserted inside a conventional paper envelope. The difficulty in concealing traditional gift cards during mailing leaves the gift cards vulnerable to theft when the envelope containing the card has been deposited into a mailbox or during conveyance of the mail. Unless the recipient contacts the gift giver to express thanks or to otherwise indicate the recipient's receipt of the gift card, the gift giver is unlikely to know whether the intended gift recipient received the gift card or whether the gift card was intercepted by an unintended third party during mailing. In addition, traditional gift cards also often lack any means by which the card can be assigned to the gift recipient so that a different unintended recipient cannot utilize the gift card by making purchases. Once the gift giver purchases the gift card, the card is funded by the gift giver and any individual in possession of the card may make purchases using it. The failure of these gift cards to incorporate any identifying information pertaining to the gift recipient renders them an unsecure means to deliver a gift because the gift card can be used by anyone who has possession of the card since no form of identification is required by the card issuer to confirm the identity of the intended recipient prior to activating and redeeming the gift card.

Conventional gift cards also usually require a gift giver to visit a retail store to obtain the card and to fund the card at the retail location. The gift cards cannot be quickly and easily obtained. In addition, traditional gift cards are often sold or provided by merchants without providing a means for sending or mailing the gift card to the gift recipient. Retailers may expect the gift giver to purchase a separate greeting card within which the gift card can be enclosed and mailed to the gift recipient. Traditional gift cards are usually provided in standard formats with a limited number of designs and often lack any means for personalizing the gift card in a way that the gift giver may desire. The lack of personalization of conventional gift cards also detracts from the sentimental nature of the gift thereby rendering them less personal and often less appreciated and less memorable to the recipient. Conventional advertising and gift card systems may also include a web-based component that utilizes a persistent URL (pURL) to identify the consumer or a particular product or service, however, the pURL does not permit the personalization and customization features often desired by both the consumer as well as the advertiser.

Because conventional gift cards are not personalized, they are disadvantageous for purposes of an advertising tool and data mining by retailers and others who wish to obtain the contact information and shopping habit information for both gift givers and gift recipients. Traditional gift cards may not incorporate any interactive components such as customization by the gift giver or personalization of the gift card by the gift giver for its intended recipient. Because no personally identifying information of the gift recipient is related to the gift card, advertisers lose a valuable opportunity to gather information concerning the gift recipient, and therefore, are unable to advertise and promote other products or services to the gift recipient. The exclusion of interactive components that would permit customization and personalization of the gift card by the gift giver is also disadvantageous in that the advertiser has little or no opportunity to advertise and promote additional products to the gift giver for purchase for personal use or for additional gifting purposes.

A need exists for an interactive gifting and advertising method that uses secure customizable gift cards that entertain the gift giver and gift recipient and which can be used for data mining purposes to collect personal identifying information that can be related to each specific consumer's shopping and advertisement browsing habits. A need exists for a gift card that is translatable between physical form and virtual form. A need exists for a gift card that can be easily managed using a remote server to fund and transfer a gift.

SUMMARY

The systems and methods described herein pertain to an interactive gifting system that entertains and involves the consumer with its interactive design so as to encourage repeat business and functions as a means of data mining to allow targeted and predictive advertising to specific consumers. The gifting system can utilize a website, a global telecommunications system, a gift card, a remote server, funds data, and a means by which the gift card can be delivered from a gift giver to a recipient. The website can be accessed by the gift giver via a global telecommunications network and may include account management features that permit the gift giver to transfer funds to a card issuer. The gift card can include a unique card identifier, for example, a gift card number, that can be used by a card issuer to match the gift card to the funds transferred from the gift giver to the card issuer for purposes of funding the gift card.

The gift card may be a virtual e-card, for example, a card that is accessed by clicking on a web link that opens the e-card in a web browser; a printable email card; a two-dimensional gift card form that can include a single sheet having perforations to separate a detachable gift card, greeting card, and envelope; or a pre-scored and/or pre-folded, three-dimensional pop-up card such as the Assembleeze™ pop-up cards manufactured by WILopEN Products, LC, of Deerfield Beach, Fla., which are folded in such a way that a portion of the card "pops up" or rises when the card is changed from closed configuration to open configuration. The pop-up portion of the card may include a photograph, e.g., a photograph of the gift giver, artwork, a logo, alphanumeric text, or any other desired information or images. The three-dimensional pop-up cards can be in the form of a greeting card or a business card and may also include a gift representation that visually represents a gift item selected by the gift giver for the gift recipient. The gift card may be custom designed for or by the gift giver or may be selected by the gift giver from among one or more templates provided by the card issuer.

The remote server is connected to the global telecommunications network and can be used to store the funds data associated with the gift card. The funds data relates to the amount of funds transferred by the gift giver to the card issuer. The means for delivering or transmitting the gift card from the gift giver to the recipient may be a mailing or courier service, electronic mail (email), facsimile, attachment to or insertion into packaging (e.g., to a top of a pizza box) or printed publications (e.g., into a magazine), or any other suitable delivery means.

The gift card system is highly customizable by the user or gift giver so that the gift giver can personally control the entire gift-giving process, including, without limitation, selection of a gift item that can be merchandise, a service, or money, personalization of a real physical or virtual gift card, and timing of delivery of the gift card to the gift recipient. The gift giver is thus able to select and purchase gifts chosen naturally by the gift giver. In addition, once the gift recipient receives the gift card, the recipient has several options that can include redeeming the gift card for the gift item selected by the gift giver, rejecting the gift item selected by the gift giver and selecting a different gift item of the same or lesser value, rejecting the gift item selected by the gift giver and selecting a different gift item of greater value by contributing additional funds toward the purchase of the different gift, or re-gifting the gift card or its monetary value to another recipient.

The gift card system provides several advantages over the traditional plastic gift card distributed and sold by retailers. Because the gift card of the gift card system can be manufactured as a paper gift card, the thinness of the paper gift card (versus a conventional plastic card) enhances the surprise effect experienced by the recipient who cannot feel the paper card through the envelope into which the card is inserted. More importantly, however, because the paper gift card cannot be felt through the envelope in which it is mailed, the paper gift card is a more secure way to send a gift via mail. The presence of the paper gift card inside the envelope is not readily apparent to an individual who may intercept mail for purposes of stealing gift cards. On the other hand, a conventional plastic gift card is easily felt, and is thus discoverable, when placed inside a standard paper envelope.

The gift card system is also advantageous because the gift card has no value to anyone other than the recipient intended by the gift giver because the gift giver must provide certain identifying information related to the recipient. After this recipient information is entered into the secure card issuer website, the recipient information can be stored on the card issuer's remote servers. To activate the gift card, the recipient must also provide matching recipient information or enter into the website a password that was generated by the gift card system and delivered via email, mail, or another delivery means when the user purchased the gift card for the recipient. Another advantage of the gift card system is that the gift card can be used for a gift other than the gift originally intended by the gift giver. The gift card system also provides an advantage in that the gift cards can be distributed inexpensively and quickly in the form of a paper gift card or as an electronic or digital card.

The method of the invention is also advantageous because a gift card account website may be used to advertise to the gift givers and recipients who access the website to fund and to activate the gift cards. By advertising through game-style product questions, advertisers (e.g., retailers and manufacturers) can both entertain users of the website and educate those users about the advertiser's products. Users of the website and system also benefit because points earned by answering product questions correctly can be redeemed immediately by a user for items such as downloadable movies and songs or pay-per-view movie credits.

Another advantage of the methods described herein is the ability of the system to advertise to people having vision and hearing impairment, people who are illiterate, and people who do not speak the predominant language of the card issuer or retailer's location. An avatar of the system used in conjunction with text-to-speech software can play or "read" aloud a description of products for sale on the card issuer or retailer's website in the user's own language.

The systems and methods of the invention are also advantageous to the retailer because, unlike when a gift giver purchases a gift item in a retail store and gives the actual gift item to the recipient, in the event that the gift recipient decides to exchange the gift item for a different gift item, the retailer does not incur any costs related to restocking. The retailer is able to avoid restocking costs because the gift item was represented in the form of a gift representation as part of the gift card, but the actual gift item selected by the gift giver for the gift recipient was never physically removed from the retailer's inventory.

Still another advantage of the systems described herein is that the gift recipient can access an account created through a system website to check the balance, purchases made, and other information related to the gift card. The gift recipient may also be provided with access to these account features via an interactive voice response system (IVR).

Yet another advantage of the systems and methods of this invention is that the gift card can be printed and mailed to the gift recipient in addition to being delivered electronically, e.g., by e-mail, to increase the likelihood that the gift recipient receives the gift card. The name of sender can be pre-printed on all the components of a gift card package such as, for example, the printed electronic gift card, a greeting card, and instructions, of the multi-component gift card package. The gift giver can print or hand-write the recipient's name on the same components to further increase the likelihood that the recipient reads the greeting card and gift card. Similar to the electronic gift card, the printed gift card can be viral in nature in that the recipient is directed to the card issuer's website in order to redeem the gift card for the gift item selected by the gift giver or for another gift item selected by the recipient.

The system can also be interactively used by advertisers such as, for example, retailers, service providers, and manufacturers, who may be given access to the gifting system to automatically upload their product and service information for advertisement to users of the website. The system of the present invention provides a gift card that is translatable between physical form and virtual form. The system of the present invention also provides a gift card that can be easily managed using a remote server to fund and transfer a gift. A method according to the present invention is provided for using the same.

Accordingly, the invention features a gifting and advertising system that can include: (i) a gift card providable in physical form, virtual form, or both, the physical form being deliverable via physical delivery and the virtual form being accessible on a first computing device that includes a connection to a communications network, wherein the gift card includes a unique identifier, wherein the gift card is transferrable from a gift giver to a gift recipient for use by the gift recipient to purchase a good or service; (ii) a remote server accessible via the communications network to access and manage the virtual form, wherein data relating to use of the remote server is recordable for analysis; (iii) a funding sub-system through which a gift giver transfers funds to a card issuer; (iv) funds data associated with the gift card and stored on the remote server relating to funds transferred by the gift giver to the card issuer; (v) an activation sub-system through which the gift recipient activates the gift card prior to purchasing the good or service; and (vi) wherein the funding sub-system and the activation sub-system collect personal information of the gift giver and of the gift recipient.

In another aspect, the invention features the virtual form being accessible via a website.

In another aspect, the invention features the personal information provided by the gift giver through the funding sub-system and by the gift recipient through the activation sub-system including at least one of the items selected from among: a name, an address, a telephone number, an e-mail address, an age, a ZIP code, a city, a state, a country, an income, an income range, a race, a sex, an ethnicity, or any other suitable item of demographic information.

In another aspect, the invention features the website including account management features that permit the gift giver to transfer the funds to the card issuer and transfer the virtual form of the gift card to the gift recipient.

In another aspect, the invention features the physical form being transferrable from the gift giver to the gift recipient via physical delivery and the virtual form being transferrable from the gift giver to the gift recipient via an electronic communication.

In another aspect, the invention features the unique identifier being shared between the physical form and the virtual form.

In another aspect, the invention features the physical form of the gift card being one detachable component of a form, wherein the form further includes a detachable greeting card and optionally includes a detachable envelope into which the physical form and the greeting card can be inserted for physical delivery to the gift recipient.

In another aspect, the invention features a predictive advertising sub-system for delivering a personalized item to the gift giver, the gift recipient, or both based upon that party's personal information provided through the system, wherein the personalized item can include at least one item selected from among: an advertisement, a product recommendation, a service recommendation, and content.

In another aspect, the invention features the physical form of the gift card being deliverable by attaching the gift card that is not activated to an article, selling the article, and activating the gift card via activation sub-system installed on the remote server via a website.

A method of the invention can be used for gifting and can include the steps of: (a) providing a gift card to a gift giver, wherein the gift card is provided in physical form, virtual form, or both, the physical form being deliverable via physical delivery and the virtual form being accessible on a computing device comprising a connection to a communications network; (b) operating a remote server accessible via the communications network to manage the virtual form; (c) storing funds data associated with the gift card on the remote server that relates to funds transferred by the gift giver to a card issuer; (d) transferring the gift card from the gift giver to a gift recipient, the gift card in the physical form being transferrable via physical delivery and the gift card in the virtual form being transferrable via an electronic communication; and (e) using software to predictively select a personalized item for presentation to at least one receiving party based upon data in a gift giver data profile or a gift recipient data profile, wherein the at least one receiving party has an increased likelihood of interest in the predictively selected personalized item, wherein the receiving party is the gift giver, the gift recipient, or both.

Another method of the invention can include step (b) above further including the step of recording data relating to use of the remote server for analysis to predict goods or services to advertise and promote to the receiving party, in which the receiving party may be interested based upon marketing analysis.

Another method of the invention can include the steps of: (f) analyzing the data; and (g) presenting an advertisement to a user of the remote server based on the analysis of the data.

Another method of the invention can include the step of: (h) associating a unique identifier with the gift card that is shared between the physical form and the virtual form.

Another method of the invention can include the remote server being accessible via a website.

Another method of the invention can include step (d) above further including the step of attaching the gift card that is not activated to an article, selling the article, and activating the gift card via the remote server.

A method of the invention can also be used for gifting and advertising and can include the steps of: (a) providing a gift card to a gift giver, wherein the gift card is provided in physical form, virtual form, or both, the physical form being deliverable via physical delivery and the virtual form being accessible on a computing device that includes a connection to a communications network, and wherein the physical form and the virtual form each include a common shared unique identifier; (b) operating a remote server accessible via the communications network to manage the virtual form; (c) recording data relating to use of the remote server by users for analysis, wherein the users are the gift giver and a gift recipient; (d) requiring each new user to register for access to the remote server via a website by creating a user account and password; (e) analyzing the data to create a demographic profile of each user, wherein each user's demographic profile is associated with the user's user account; (f) storing funds data associated with the gift card on the remote server that relates to funds transferred by a gift giver to a card issuer, wherein the funds data is associated with the user account of a gift recipient; (g) transferring the gift card from the gift giver to the gift recipient, the gift card in the physical form being transferrable via physical delivery and the gift card in the virtual form being transferrable via an electronic communication; (h) permitting the gift recipient to purchase a good or service using the funds associated with the gift card; (i) associating the good or service purchased by the gift recipient with the unique identifier; (j) compiling data based on the gift recipient's purchased good or service and the gift recipient's potential interest data that is associated with the gift recipient's user account; and (k) presenting a personalized item to at least one user of the remote server based upon the user's predicted interests in goods and services as determined from the user's demographic profile associated with the user's user account, wherein the personalized item can include at least one item selected from among: an advertisement, a product recommendation, a service recommendation, and content.

Another method of the invention can include the gift card being one-sided or two-sided, wherein account-related information and the unique identifier are printed or imprinted on only one side of the gift card or on two sides of the gift card.

Another method of the invention can include the web site including one or more goods, services, or a combination of one or more goods or services from which the user may select to make a purchase.

Another method of the invention can include, once the funds transferred to the card issuer by the gift giver have been used by the gift recipient in purchasing the good or service, the gift card being reusable in that new funds may be transferred to the card issuer to generate new funds data that is stored on the remote server and associated with the gift recipient's user account and further compiling data related to any new purchases of goods or services made using the reused gift card.

Another method of the invention can include the gift recipient being the same person as the gift giver.

A method of the invention can also be used for creating a customized online shopping experience for a customer, the method including the steps of: (a) providing a gift card to a gift giver of unknown identity, wherein the gift card is provided in physical form, virtual form, or both, the physical form being deliverable via physical delivery and the virtual form being accessible on a first computing device that includes a connection to a communications network; (b) operating a remote server accessible via the communications network to manage the virtual form; (c) to activate the gift card for a first activation before transferring funds to a card issuer and to create a gift card account associated with the gift card to receive funds transferred by the gift giver into the gift card account in association with the gift card, requiring the gift giver of unknown identity to submit (i) the gift giver's name so that the gift giver's identity becomes known, (ii) at least one gift giver personal information item, (iii) the name of a gift recipient, and (iv) at least one gift recipient personal information item; (c) storing funds data associated with the gift card on the remote server that relates to funds transferred by the gift giver to the card issuer; (d) transferring the gift card from to the gift giver to the gift recipient, the gift card in the physical form being transferrable via physical delivery and the gift card in the virtual form being transferrable via an electronic communication; (e) optionally, requiring the gift recipient to activate the gift card for a second activation before making a purchase using the gift card, wherein the second activation is performed by submitting (i) the gift recipient's name and (ii) at least one gift recipient personal information item; (f) making a purchase of a good or service by the gift recipient using either the physical form of the gift card or the virtual form of the gift card; and (g) analyzing the at least one gift giver personal information item, the at least one gift recipient personal information item, or both to compile data about the gift giver, the gift recipient, or both into a gift giver data profile, a gift recipient date profile, or both, respectively.

Another method of the invention can include at least one step selected from among: (h) using software to predictively select a personalized item for presentation to the gift giver based upon data in the gift giver data profile, wherein the gift giver has an increased likelihood of interest in the predictively selected personalized item; and (i) using software to predictively select a personalized item for presentation to the gift recipient based upon data in the gift recipient data profile, wherein the gift recipient has an increased likelihood of interest in the predictively selected personalized item.

Another method of the invention can include the personalized item being at least one item selected from among: an advertisement, a product recommendation, a service recommendation, and content.

Another method of the invention can include the personalized item including a physical form that is delivered by physical delivery, a virtual form that is delivered electronically, or both.

Another method of the invention can include the physical form of the gift card being temporarily attachable to a greeting card.

Another method of the invention can include the virtual form of the gift card being incorporated in an electronically transmitted virtual greeting card that permits the gift recipient to access the virtual form of the gift card from the first computing device or another computing device comprising a connection to the communications network.

Another method of the invention can include the virtual form of the gift card being usable to make the purchase via electronic means via a website or by printing a physical copy of the virtual form of the gift card for exchanging for the good or service at a physical retail store.

Another method of the invention can include can further include the step of: (j) providing a website accessible via the first computing device or another computing device that includes a connection to the communications network, wherein the website features goods, services, or both available for purchase by the gift recipient using the gift card.

Another method of the invention can further include at least one step selected from among: (k) customizing the website for the gift giver by displaying an advertisement, a product recommendation, a service recommendation, or content predictively selected for the gift giver by software based on the gift giver's expressed or predicted personal interests determined from data in the gift giver data profile; and (1) customizing the website for the gift recipient by displaying an advertisement, a product recommendation, a service recommendation, or content predictively selected for the gift recipient by software based on the gift recipient's expressed or predicted personal interests determined from data in the gift recipient data profile.

Another method of the invention can further include at least one step selected from among: (m) before step (c) above, requiring the gift giver to create a user account and a password to access the user account; and (n) before step (e) above, requiring the gift recipient to create a user account and a password to access the user account.

Another method of the invention can include the gift card including a unique identifier that is associated with the user account of the gift giver, the user account of the gift recipient, or both.

Another method of the invention can further include at least one step selected from among: (o) storing the data of the gift giver data profile in a first database of a system administrator and electronically comparing the gift giver data profile to data in a second database of a third party to match the gift giver's personal data across multiple platforms; and (p) storing the data of the gift recipient data profile in a first database of a system administrator and electronically comparing the gift recipient data profile to data in a second database of a third party to match the gift recipient's personal data across multiple platforms.

Another method of the invention can include the system administrator being an advertiser, a retailer, a manufacturer, a distributor, or a system service provider who provides services of the method to advertisers, retailers, manufacturers, distributors, or a combination of the foregoing; and wherein the third party is a different advertiser, a different retailer, a different manufacturer, a different distributor, or a different system service provider.

Another method of the invention can include the gift card being customizable by printing, imprinting, or electronic means by the gift giver.

The invention also features a dual physical and virtual gift card, wherein the gift card can include a physical form deliverable via physical delivery means and a virtual form deliverable via electronic means; wherein the gift card can include a unique identifier that appears on both the physical form and the virtual form; wherein the physical form is optionally deliverable via the physical delivery means by the gift giver; wherein, after the transfer of funds from the gift giver to a card issuer, the virtual form is deliverable via the electronic means by a system including a web site for creating a new user account and funding the gift card; and wherein either the physical form or the virtual form is capable of being used to purchase a good or service.

In another aspect the invention can feature the physical form including one detachable component of a form, wherein the form further includes a detachable greeting card and optionally can include a detachable envelope into which the physical form and the greeting card can be inserted for delivery via the physical delivery means.

In another aspect the invention can feature a visual appearance of the virtual form being customizable by the gift giver.

Unless otherwise defined, all technical terms used herein have the same meaning as commonly understood by one of ordinary skill in the art to which this invention belongs. Although methods and materials similar or equivalent to those described herein can be used in the practice or testing of the present invention, suitable methods and materials are described below. All publications, patent applications, patents and other references mentioned herein are incorporated by reference in their entirety. In the case of conflict, the present specification, including definitions will control.

BRIEF DESCRIPTION OF THE DRAWINGS

FIGS. 7-8 are flow charts that show other methods by which a gift giver can obtain a gift card that can be delivered to a recipient who accesses a card issuer's website to redeem the gift card for a gift.

DETAILED DESCRIPTION

Figure 1:
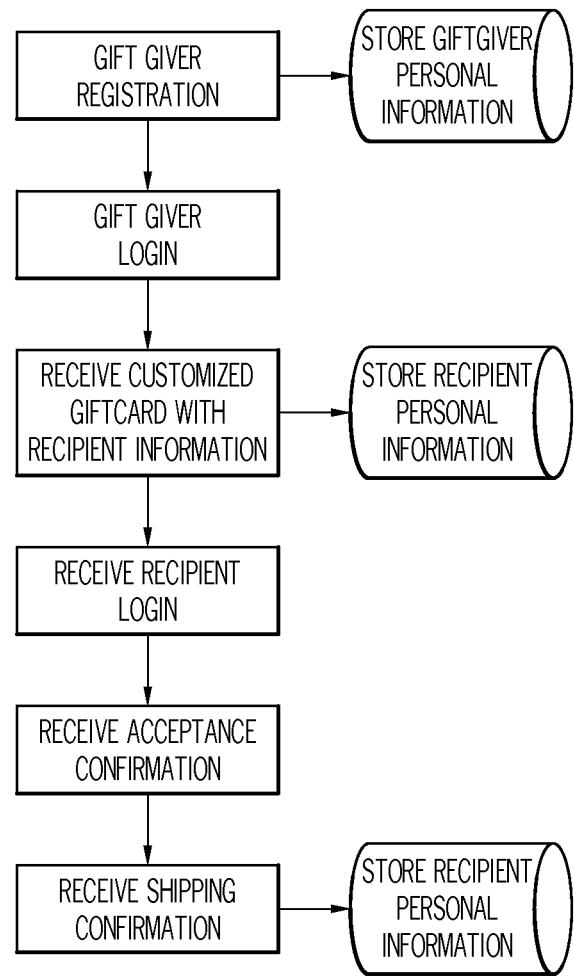
FIGS. 1-5 are flow charts that show one method by which a gift giver can purchase a gift in the form of a gift card for delivery to a recipient.
Figure 2:
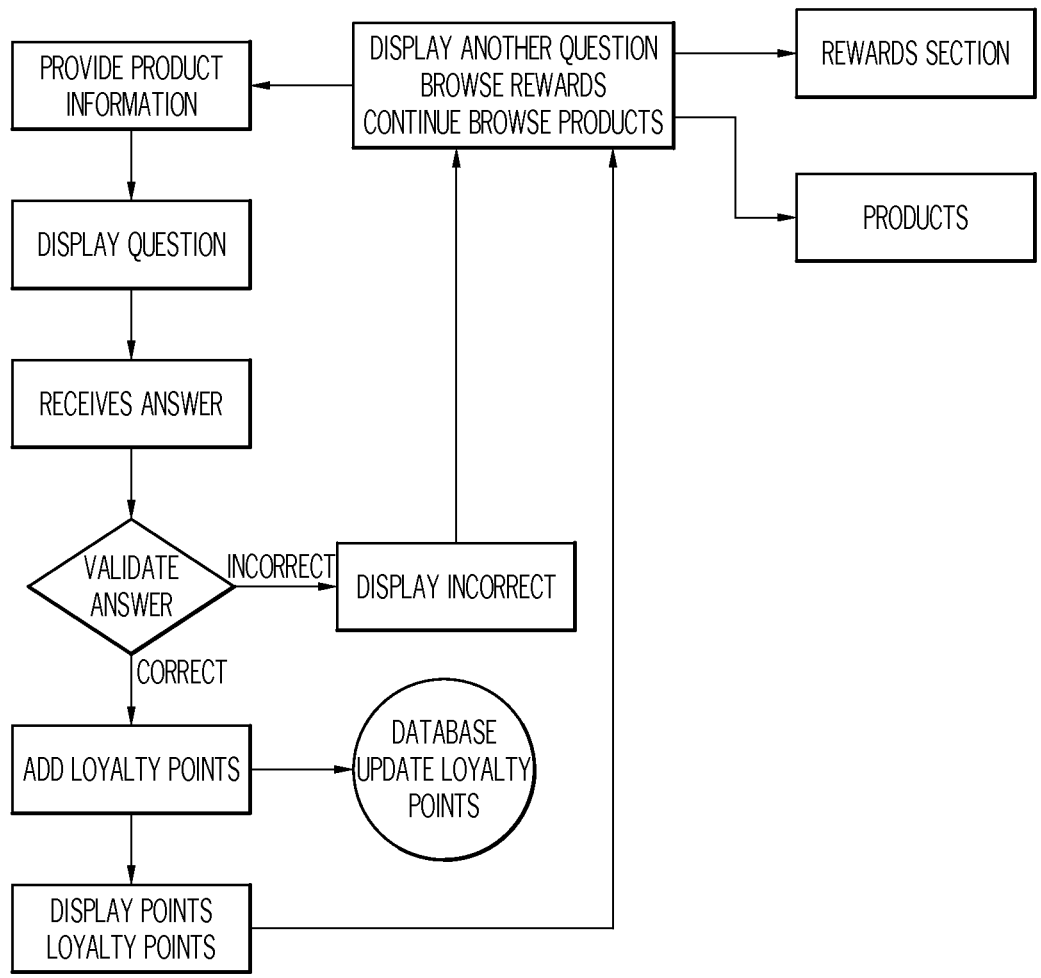
Figure 3:
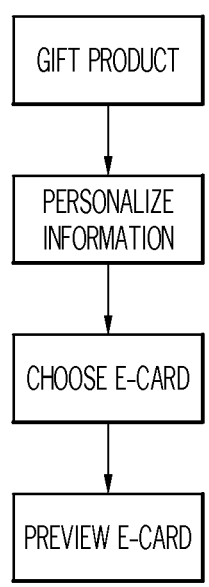
Figure 4:
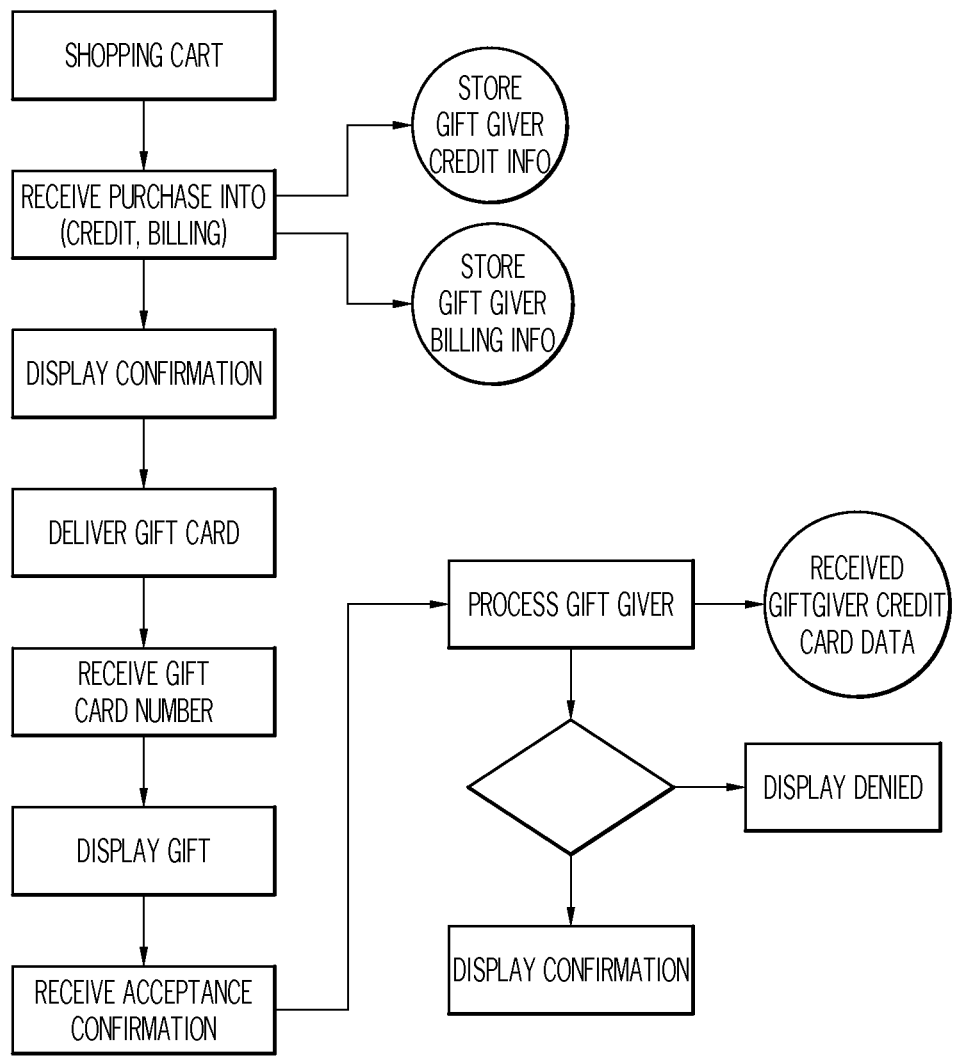
Figure 5:
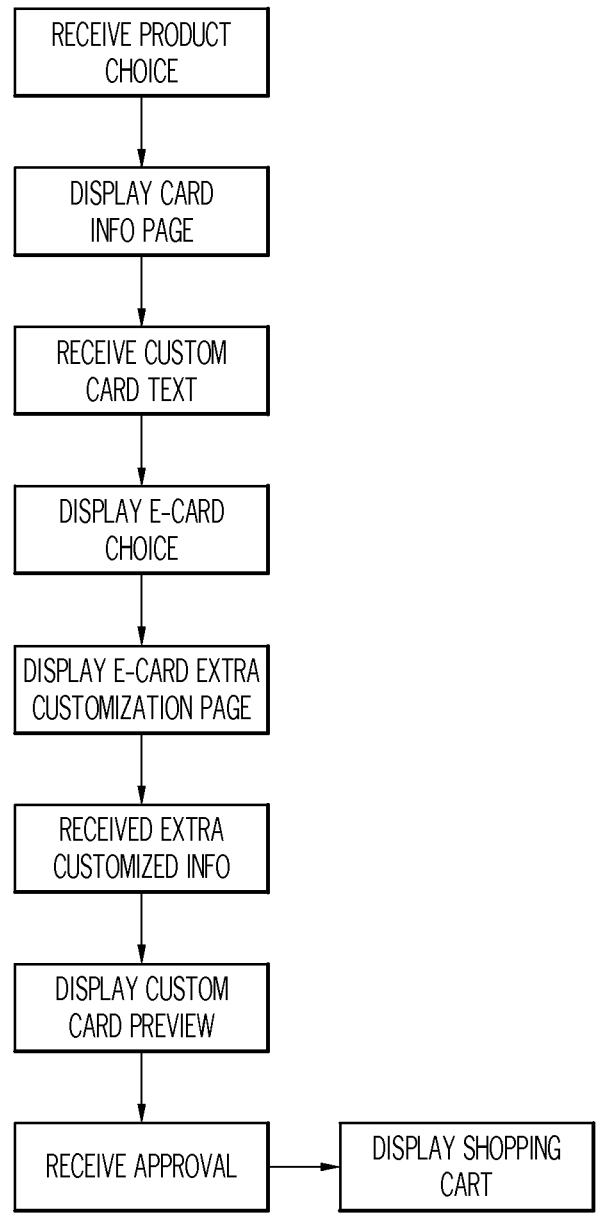
Figure 6A:
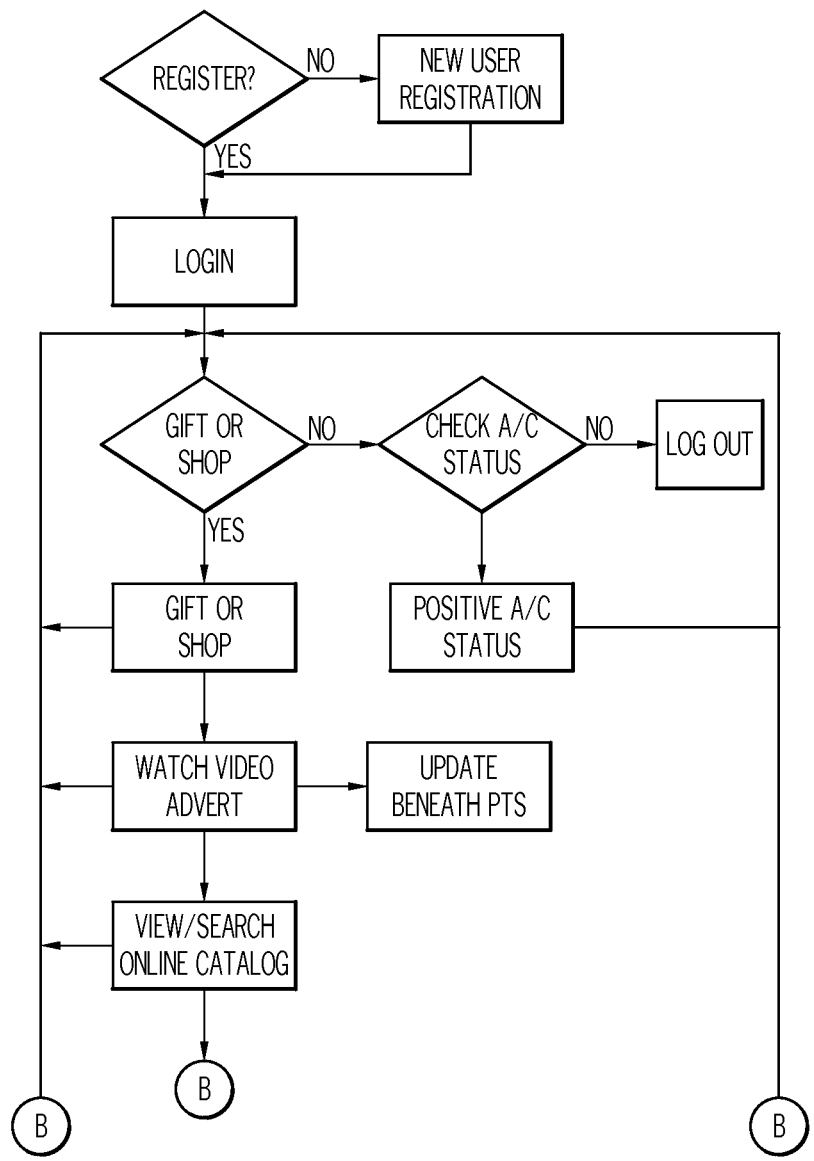
FIG. 6A-6B are flow charts that show another method by which reward points can be earned by a gift giver or a recipient by accessing a card issuer's website.
Figure 6B:
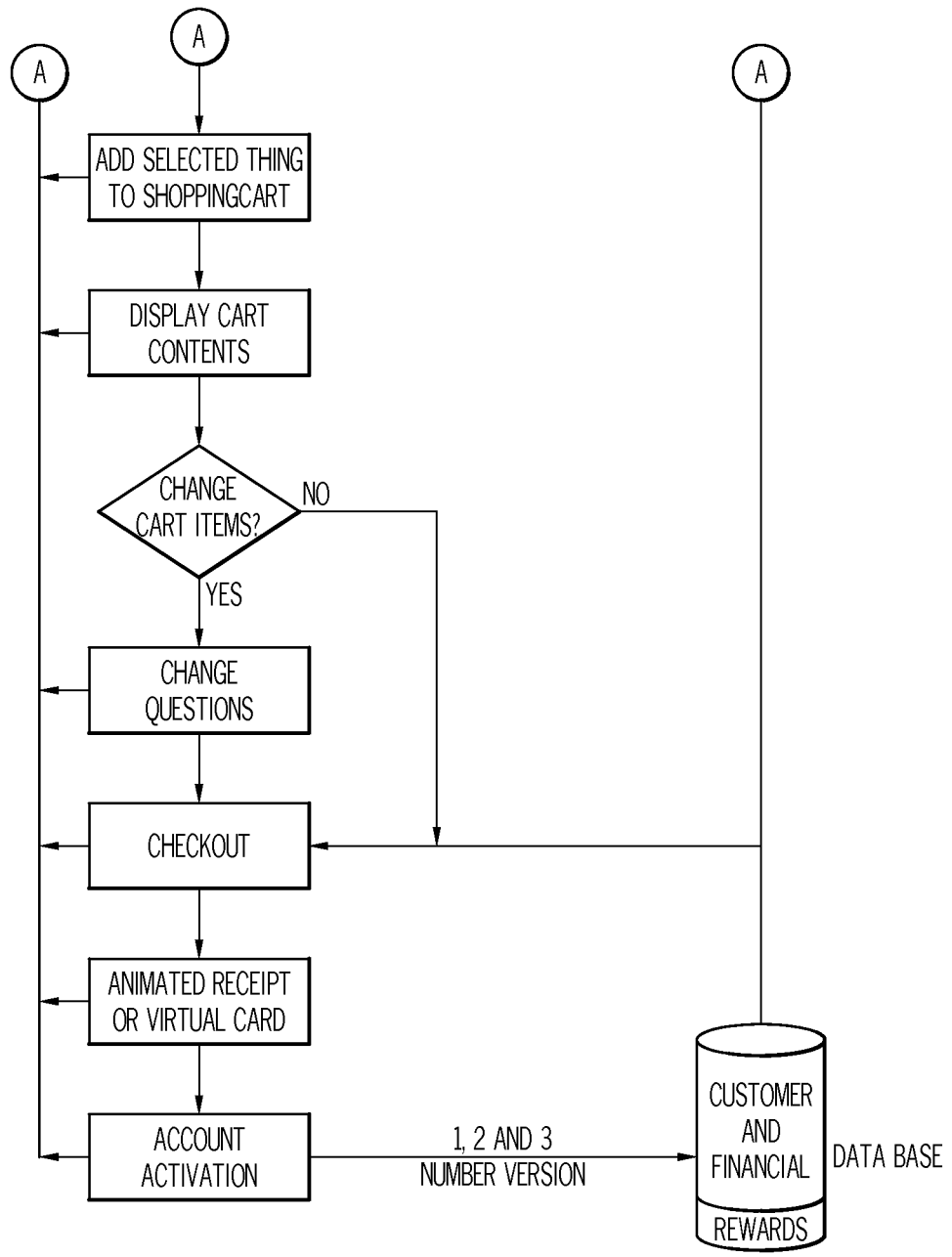
Figure 7:
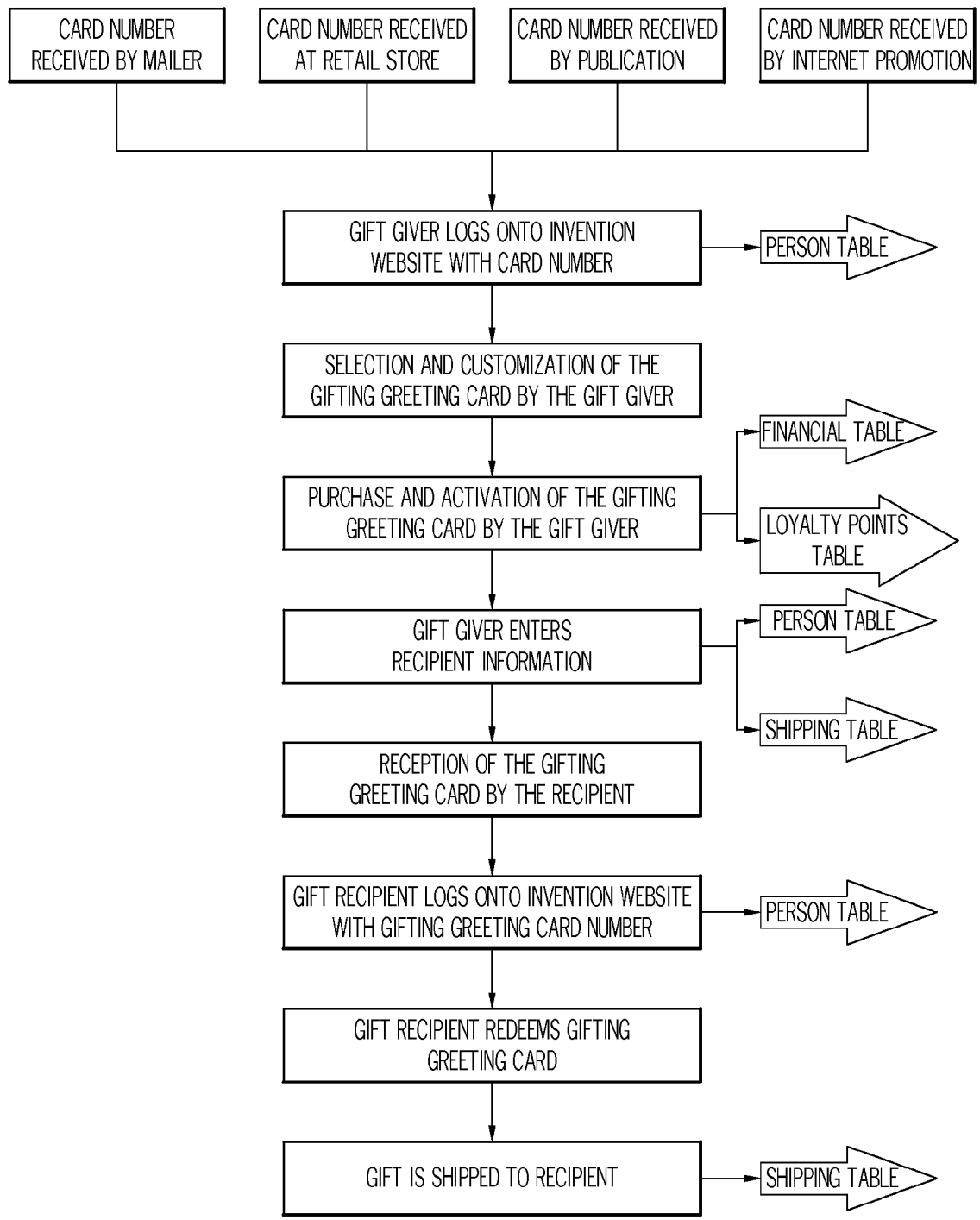

The present invention is best understood by reference to the detailed drawings and description set forth herein. Embodiments of the invention are discussed below with reference to the drawings; however, those skilled in the art will readily appreciate that the detailed description given herein with respect to these figures is for explanatory purposes as the invention extends beyond these limited embodiments. For example, in light of the teachings of the present invention, those skilled in the art will recognize a multiplicity of alternate and suitable approaches, depending upon the needs of the particular application, to implement the functionality of any given detail described herein beyond the particular implementation choices in the following embodiments described and shown. That is, numerous modifications and variations of the invention may exist that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

The present invention should not be limited to the particular methodology, compounds, materials, manufacturing techniques, uses, and applications, described herein, as these may vary. The terminology used herein is used for the purpose of describing particular embodiments only, and is not intended to limit the scope of the present invention. As used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" may be a reference to one or more steps or means and may include sub-steps and subservient means.

All conjunctions used herein are to be understood in the most inclusive sense possible. Thus, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should be read as "and/or" unless expressly stated otherwise. Structures described herein are to be understood also to refer to functional equivalents of such structures. Language that may be construed to express approximation should be so understood unless the context clearly dictates otherwise.

Unless otherwise defined, all terms (including technical and scientific terms) are to be given their ordinary and customary meaning to a person of ordinary skill in the art, and are not to be limited to a special or customized meaning unless expressly so defined herein.

Terms and phrases used in this application, and variations thereof, especially in the appended claims, unless otherwise expressly stated, should be construed as open ended as opposed to limiting. As examples of the foregoing, the term "including" should be read to mean "including, without limitation," "including but not limited to," or the like; the term "having" should be interpreted as "having at least"; the term "includes" should be interpreted as "includes but is not limited to"; the term "example" is used to provide exemplary instances of the item in discussion, not an exhaustive or limiting list thereof; and use of terms like "preferably," "preferred," "desired," "desirable," or "exemplary" and words of similar meaning should not be understood as implying that certain features are critical, essential, or even important to the structure or function of the invention, but instead as merely intended to highlight alternative or additional features that may or may not be utilized in a particular embodiment of the invention.

Those skilled in the art will also understand that if a specific number of an introduced claim recitation is intended, such an intent will be explicitly recited in the claim, and in the absence of such recitation no such intent is present. For example, as an aid to understanding, the appended claims may contain usage of the introductory phrases "at least one" and "one or more" to introduce claim recitations; however, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C" is used, in general, such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.).

All numbers expressing dimensions, quantities of ingredients, reaction conditions, and so forth used in the specification are to be understood as being modified in all instances by the term "about" unless expressly stated otherwise. Accordingly, unless indicated to the contrary, the numerical parameters set forth herein are approximations that may vary depending upon the desired properties sought to be obtained.

The present invention will now be described in detail with reference to embodiments thereof as illustrated in the accompanying drawings. In the following description, a customizable gifting and advertising system and method will be discussed. Those of skill in the art will appreciate alternative labeling of the customizable gifting and advertising system and method as a gifting system, advertising system, system, method, the invention, or other similar names Skilled readers should not view the inclusion of any alternative labels as limiting in any way. Reference to electronic and virtual forms is used interchangeably throughout, and should not read to impose any limitation on either terminology.

The invention provides interactive gifting systems and methods that can include multimedia components. The gifting system can be utilized by a gift card issuer to promote and advertise retail products and services to a user through gifting, entertainment, and game and rewards methods. The user can be a consumer, and the consumer can be a gift giver or a gift recipient. The card issuer can be an advertiser, a retailer, a manufacturer, or a service provider.

The invention can include a gift card system that allows gift-giving by a gift giver to a gift recipient and serves as an advertising and marketing tool for goods and services produced, provided, and sold by manufacturers and retailers. The gift card system can include a gift card, which may be a physical gift card, an electronic gift card, or both. The system may include only a single gift card so that the gift giver can purchase his or her own greeting card and envelope within which the gift card can be inserted.

In an exemplary embodiment, the gift card can be a combination gift card 12, greeting card, instruction sheet, and envelope 14. These components can form a gift card package 10 that can be delivered to the gift recipient. The gift card package can also include a catalog, a brochure, a pamphlet, or another suitable insert 16 containing images or descriptions of products that can be purchased by the gift giver for the gift recipient. These components of the exemplary embodiment may be manufactured by any suitable printing and folding means. Each gift card 12 can be personalized with a unique card identifier 32 such as, for example, a hexadecimal number or a standard sixteen-digit gift card number that may be accepted for payment at point-of-sale (POS) terminals at retail locations. The gift card 12 can also be marked with or have printed or affixed thereon a product or retailer name 34 or logo. The gift card can also have a description of a gift item selected by the gift giver printed thereon or affixed thereto. In other embodiments, either or both of the greeting card and the envelope may also include product or retailer names, logos, or descriptions printed thereon or affixed thereto. The gift card may be one-sided and/or multi-sided.

In another embodiment, the system may include only a gift card, a greeting card, and an envelope. In still another embodiment, the system may include only a gift card and an envelope. In still other embodiments, either or both of the greeting card and the instructions may be omitted. In one embodiment, the system can further include a receipt. In one embodiment, the gift card system can include an envelope that is manufactured around the gift card and other contents (e.g., greeting card, instruction sheet, and catalog) so that these items are enclosed within the envelope simultaneously with the manufacturing of the envelope.

The physical gift card can be a gift card constructed from paper, plastic, or another suitable material on which indicia may be printed, embossed, engraved, stamped, or affixed. The electronic gift card can be a downloadable file, a web page, a virtual card or an e-mail, any of which may contain alphanumeric text and other type characters, images, audio data, video data, or other types of data suitable for inclusion in or attachment to the electronic gift card. The gift card can be redeemable for a gift item. The gift item can be a good, e.g., a retail item such as a shirt or a television, or a service, such as, for example, a manicure or a golf lesson. In another embodiment, the gift card can be redeemable for money.

In embodiments in which the gift card is a physical gift card, the gift card can be a printable email card, a two-dimensional gift card, or a three-dimensional card. In one embodiment, the two-dimensional gift card can include a form that can features a single sheet having perforations to separate a detachable gift card, greeting card, and envelope. In another embodiment, the three-dimensional gift card can be pre-scored and/or pre-folded and may include a pop-up portion, which is folded in such a way that a portion of the card "pops up" or rises when the card is changed from a closed configuration to an open configuration. The pop-up portion of the card may include a photograph, e.g., a photograph of the gift giver, artwork, a logo, alphanumeric text, or any other desired information or images. The three-dimensional pop-up cards can be in the form of a greeting card or a business card and may also include a gift representation that visually represents a gift item selected by the gift giver for the gift recipient. The gift card may be custom designed for or by the gift giver or may be selected by the gift giver from among one or more templates provided by the card issuer.

The gift card can be personalized by the gift giver. The personalized gift card can be further customized using personal information of the gift giver and/or of the recipient. Personal information can include a name, address, location information, photograph, e-mail address, birth date, anniversary date, or other personally significant information related to either or both of the gift giver and the gift recipient.

The gift card system can further include a gift representation of at least one gift item. In an exemplary embodiment, the gift card system can include a plurality of gift representations each of which depicts a unique gift item. The gift representations can be depicted in the form of a photograph or a drawing of the gift item. In another embodiment, the gift representation can be a written or typed name of the gift item and may further include a written or typed description of the gift item. The gift representations can be displayed as part of a list or other collection of gift representations.

The gift representation may be displayed on printed material or electronically. For example, the gift representation may be printed in a magazine, a catalog, a brochure, or other printed matter. In another example, the gift representation can be displayed as an electronic image, video, or text on a website or in an e-mail. Skilled artisans will appreciate additional types of electronic communications through which a gift card may be distributed, including facsimile, text message, social networking websites, web publishing services, blogs, electronic bulletin boards, advertisements, video conferences, newsgroups, chat rooms, instant messaging, video sharing services, and/or other types of electronic communication that would be apparent after having the benefit of this disclosure.

The gift card or a plurality of gift cards, e.g., a multi-pack, can be delivered to the gift giver who may select from among the gift cards, each of which may include a different gift representation, a gift item to be purchased for the gift recipient. The gift card or a package containing the plurality of gift cards can be delivered to the gift giver by direct mail or obtained by the gift giver at a retail store location. The gift card or package of gift cards can be delivered to the gift giver upon the gift giver's request or may be mailed or otherwise delivered to the gift giver unsolicited. The gift representations appearing on each gift card can be printed, embossed, engraved, or stamped onto each gift card. In another embodiment, the gift representation can be printed on a stamp having an adhesive backing that can be affixed to the gift card. In embodiments in which a gift card package is provided to the gift giver, the package may include a catalog that can contain a plurality of gift representations each of which is printed on a detachable stamp. The gift giver can select one or more gift items by detaching the gift representation stamp for each selected gift item and attaching the stamp or stamps to one or more gift cards to be delivered by the gift giver to the gift recipient.

The gift card system can also include a website having a graphical user interface (UI) that is accessible via a communications network such as, for example, the Internet. In other embodiments, the communications network can be a local area network (LAN), a wide area network (WAN), a global area network (GAN), an intranet, or another suitable communications network. The graphical user interface of the website can be capable of receiving information input or uploaded by a user of the website (such as, for example, the gift giver or the gift recipient) and of transmitting the information to a server. The server can be a remote server. The server can include a processor for electronically manipulating the data transmitted to the server via the website. The server can also include a data storage device, which serves to store information submitted through the UI and transmitted by software of the website to the server via the communications network. Information submitted through the UI and website can include personal information of the gift giver and gift recipient, credit card or other account number information enabling the gift giver or gift recipient to make a purchase, and photographs, images, audio files and video files permitting customization of the gift card or of a greeting card by the gift giver.

The UI and/or website may include a voice engine to provide audible instructions. The voice engine may include one or more audible instructions, which may include user directions, general information, and other instructions that can be recited to a user. The audible instructions may include pre-recorded messages, electronically read text-to-speech, or other audible delivery techniques. Each page of the website may be associated unique instructions deliverable by the voice engine. The audible instructions to be recited by the voice engine may be updatable via the UI and/or website by altering text relating to the instructions.

In one embodiment, the website can include account management features that permit the gift giver to transfer funds to the card issuer. The remote server connected to the global telecommunications network can be capable of storing funds data associated with the gift card. The funds data relate to the funds transferred by the gift giver to the card issuer.

The website can include a dynamic button navigation system permitting the user to easily and quickly navigate the gift representations representing gift items that are displayed on the website. The dynamic button navigation system can also be used by the gift giver or gift recipient to navigate between retailers whose products are available for purchase on the card issuer's website.

The website may include a backend interface accessible by a virtual store or merchant. The backend interface may permit the virtual store or merchant to define products, gift cards, promotions, or other items that can be offered to gift givers and/or gift recipients. The backend interface may additionally include one or more components of the UI and/or website discussed above.

In one method, the gift giver can send a physical or electronic gift card to the gift recipient by purchasing the gift item and ordering the gift card using the gift card system website. Electronic gift cards may be used by the gift recipient as virtual gift cards. The gift card may be transferrable between physical and virtual forms via a web interface, software operable over a network, telephone, mail, or other transferring system.

In another method, where the gift giver has received or obtained a physical gift card by direct mail or other delivery means, the gift giver may activate the gift card by funding the gift card to purchase the gift item represented by the gift representation thereon using purchasing features on the gift card system website. The gift card can then be mailed by the gift giver or otherwise delivered by the gift giver to the gift recipient. The gift recipient can then activate the card by accessing the system website, providing identifying personal information or a code provided by the gift giver, and using gift redemption features of the website to redeem the gift card for the gift or to select a different gift item than the one selected by the gift giver. In this method, the gift giver engages in a first (or purchase phase) activation of the gift card initially and the gift recipient engages in a second (or redemption phase) activation of the gift card to redeem the gift card for the gift item or for another item selected by the gift recipient.

In an exemplary embodiment of the gift card system, the gift card can include the unique card identifier. The unique card identifier may be a unique account or identification number (e.g., a series of alphanumeric characters such as a series of sixteen numbers), a hexadecimal number, a unique bar code encoding a unique account or identification number, a chip storing and encoding a unique account or identification number, or another unique identifier that associates the gift card with an account of the user into which monetary funds have been deposited. The unique card identifier can also be associated with the user and the user's personal information.

In an exemplary embodiment, the unique card identifier can be a hexadecimal number, also known as a hexadecimal digit or hex number. The hexadecimal digit may be standard in that it may be represented by a combination of the numbers 0-9 and the letters A-F. The hexadecimal number may include a check digit that can be used to detect errors in the input of the hexadecimal digit, for example, where one digit of the hexadecimal number is mistyped.

The hexadecimal number can be used to identify the gift card, its original distribution method (e.g., direct mail or insertion into a publication), and the original recipient (i.e., the gift giver). The hexadecimal number can also be used by the gift giver to perform a first activation in which the gift card is activated and funded by the gift giver. The gift card can then be delivered to the gift recipient in a gift card package. If the gift giver is a new user, the website may prompt the gift giver to register to create a new account before permitting the gift giver to activate and fund the gift card.

Upon receipt of the gift card package, the gift recipient can access the system website and submit the same hexadecimal number to perform a second activation of the gift card that confirms receipt of the gift card by the correct intended recipient. During this second activation, the website may also provide the recipient with an option to send a printed or electronic "thank you" message to the gift giver.

In an exemplary embodiment, the hexadecimal number can be used in connection with internet-based transactions and gift redemptions conducted through the system website. In another embodiment of the system, the hexadecimal number can be submitted through the website and converted by software to a printable document that can be used by the gift recipient at a brick-and-mortar retail location having a POS system. Once printed, the printable document, i.e., the printed gift card, can include a bar code in which a standard sixteen-digit gift card number is encoded that will be accepted by a POS terminal. In another embodiment, the printed gift card can include the printed standard gift card number and no bar code. The hexadecimal number can also be used by system software to identify the user accessing the website so as to customize the website based upon data available that is related to the specific user.

The hexadecimal number may be printed or otherwise notated on or in a source such as, for example, the gift card, which can be either a physical card, e.g., a gift card constructed from paper or plastic, or a virtual gift card or "e-gift card." Hexadecimal numbers may also be printed on or in any of numerous other sources including, without limitation, catalogs, newspaper advertisements, catalog and newspaper inserts, brochures, magazines, conventional greeting cards, and virtual greeting cards or "e-greeting cards."

Each hexadecimal number can be unique and may be used as a primary identification ("primary ID") for one or more items of information. For example, the primary ID can be a name, address, e-mail address, telephone number, facsimile number, publication name, publication issue date, publication volume, card issuer name, account number, or any other item of information that identifies a person, entity, or publication. Publications may include, for example, brochures, catalogs, magazines, newspapers, and advertising inserts.

Each hexadecimal number can also be used as a secondary identification ("secondary ID") for one or more items of information. For example, the secondary ID can be the name of a publisher or retailer, an effective date, an in-house date, a publication date, a date of transaction, a source of a mail list, a recipient's name, a recipient's address, a recipient's e-mail address, a specific product, a gift giver's name, a gift giver's address, a gift giver's e-mail address, a type of transaction, or other information that can be used to identify the gift giver, the recipient, the publisher, or the retailer.

In an exemplary embodiment, the source can be an e-gift card that may feature the name and address of a direct mail recipient of the e-gift card as the primary ID. The secondary ID can be one or more of the publisher, the retailer, the specific product, the publication date of the publication, the date of the transaction, and the type of transaction.

In another embodiment, the source can be a virtual greeting card that may feature the recipient's e-mail address as the primary ID. The secondary ID can be one or more of the gift giver's e-mail address, specific product, publisher, retailer, date of transaction, and the type of transaction.

In another embodiment, the source can be a catalog such as, for example, a store catalog. The primary ID can be the name and address of the catalog recipient. The secondary ID can be one or more of the catalog publisher, retailer, in-house date, effective dates, the source of the mail list, specific product in the catalog, and recipient's e-mail address.

In another embodiment, the source can be a newspaper insert that may feature the issue date and publication volume as the primary ID. The secondary ID can be a specific product.

In another embodiment, the source can be a newspaper advertisement that may feature the issue date and publication volume as the primary ID. The secondary ID can be a specific product.

In another embodiment, the source can be a brochure and the primary ID can include the publication issue date and publication volume. The secondary ID can be one or more of a specific product, the publisher, the retailer of a specific product, the publication date, the effective date, the name and address of the brochure's recipient, and the recipient's e-mail address.

In still another embodiment, the source can be a magazine and the primary ID can be the magazine recipient's name and address. The secondary ID can be one or more of the magazine publisher, the in-house date, effective date, the source of the mail list, a specific product, and the recipient's e-mail address.

In yet another embodiment, the source can be a conventional gift card or conventional greeting card. The primary ID can be the card issuer and an account number. The secondary ID can be one or more of the recipient's e-mail address, a specific product, the date of transaction, and the type of transaction.

The hexadecimal number can be used in conjunction with one or more computer databases to track the purchasing habits of consumers including both gift givers and recipients. The information obtained by the retailer, publisher, or advertiser using the tracking features can be used for predictive advertising in which related products are suggested to the gift giver or to the recipient after a first product is purchased. For example, the system may use data related to a gift giver's purchase of a birthday gift for a recipient during the previous year to recommend products or services for purchase by the gift giver for the recipient's birthday during the current year. In one embodiment, the hexadecimal number can be used in connection with social networking websites such as, for example, Facebook™ or MySpace™, to obtain information and data pertaining to the users of the social networking website. The data and information obtained may relate to advertisements viewed within the social networking website by its users. This user data and information can be compiled in a computer database and linked to products or services that can be displayed in advertising targeted to and customized for specific individuals or groups of individuals.

In another embodiment, the unique identifier can be a stock keeping unit (SKU) where each product is assigned a separate and unique SKU. The SKU can be a universal SKU system that may be used to identify products by multiple retailers or manufacturers rather than a conventional SKU that uses digits assigned by each retailer or manufacturer using its own numbering system. The hexadecimal number can be used in place of the SKU or in combination with the SKU.

In one embodiment, a hexadecimal number appearing in a catalog or other publication, once entered into the system by the user using the system website, can be used by the system to identify the user and the publication, for example, where the publication is a subscription sent regularly to the user. The catalog can further include unique SKU's each of which identifies a unique retail item or service or gift item displayed in the catalog. The user can select a gift item or retail item or service for purchase by entering the item's associated SKU into the UI of the website. The system then directs the user to a web page of the website that provides information about the selected item as well as purchasing options.

The hexadecimal number associated with a gift item appearing in a publication can be entered into the website's UI by the user, which is then identified by the system and matched with the location or IP address of a specific web page on the retailer or card issuer's website that can display an image of the gift item and a description of the gift item. The system associates the hexadecimal number with the user so that the system can track, among other data, the user's history concerning publications read by the user, products viewed on the system website by the user, and products purchased through the system website by the user.

The gift card can be used by the gift giver to make a monetary gift to the recipient that can be used to purchase goods or services from a specific retailer, manufacturer, or service provider, or, in one exemplary embodiment, to make a gift to the recipient that is a specific good sold or produced by a specific manufacturer or retailer or a specific service provided by a specific service provider.

For example, the gift card could be for a specific magazine subscription, a specific perfume, or a specific set of golf clubs. The gift card could also be redeemable for a service such as a manicure or trip to a day spa. The gift card may include a photograph or other image of the gift selected by the gift giver for the recipient. The gift card may further include a web address for the card issuer's website where the recipient can redeem the gift card. The gift card 12 can also feature the purchase price or fund amount 36 of the card so that the recipient will know the amount of funds available to use for purchases made when redeeming the card. The gift card can be obtained by the gift giver from a card issuer, who may be a retailer, manufacturer, advertiser, or a third party working on behalf of the retailer, manufacturer, or advertiser.

The gift card system also includes means for the gift giver to deliver the gift card to the recipient. The delivery means can be a separate envelope into which the gift card can be inserted, an integrated gift card-envelope combination, or an email or other electronic or digital delivery means that can be viewed on a display monitor and/or printed by a printer connected to a computer.

The gift card may be a stored-value card that includes a magnetic strip to encode the card number and funds data. In an exemplary embodiment, funds data is the amount of money transferred to the card issuer by the gift giver to fund the card. The funds data can be physically stored as data encoded on a magnetic strip of the gift card, however, in an exemplary embodiment, the funds data is stored on a remote server that is accessible via a global telecommunications network. The remote server can be maintained by an issuer of the card. Users of the remote server may include, but should not be limited to, gift givers, recipients, and card issuers.

Figure 9A:
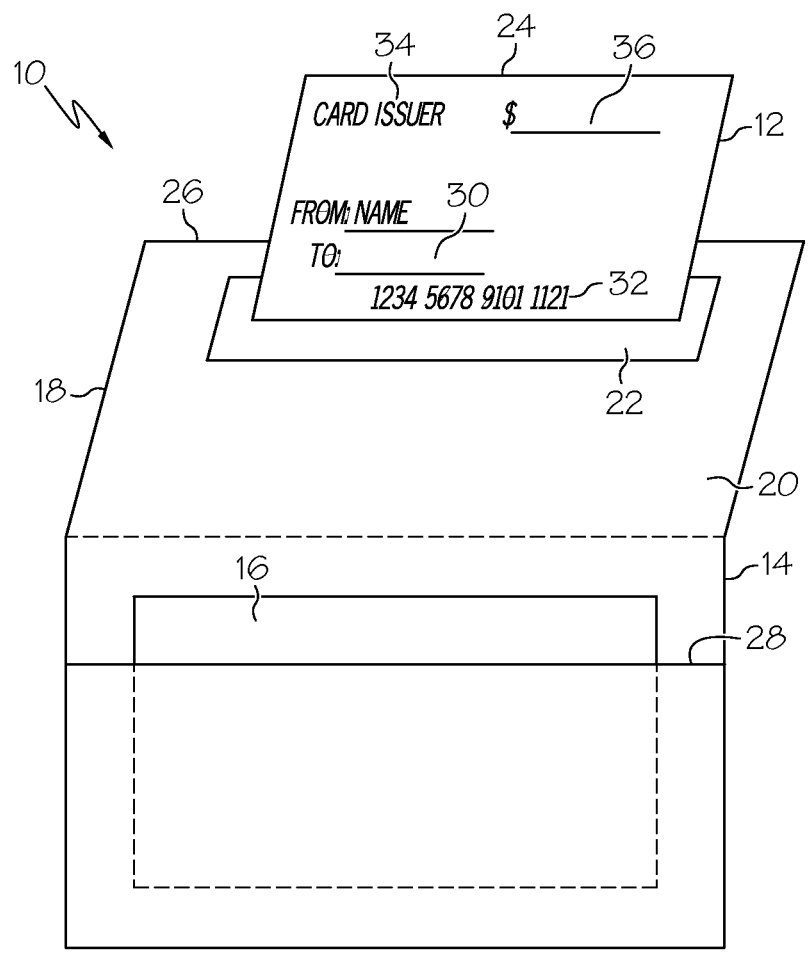
FIG. 9A is a front planar view of the combined gift card and envelope with the envelope shown in open configuration containing a separate detached brochure.
Figure 9B:
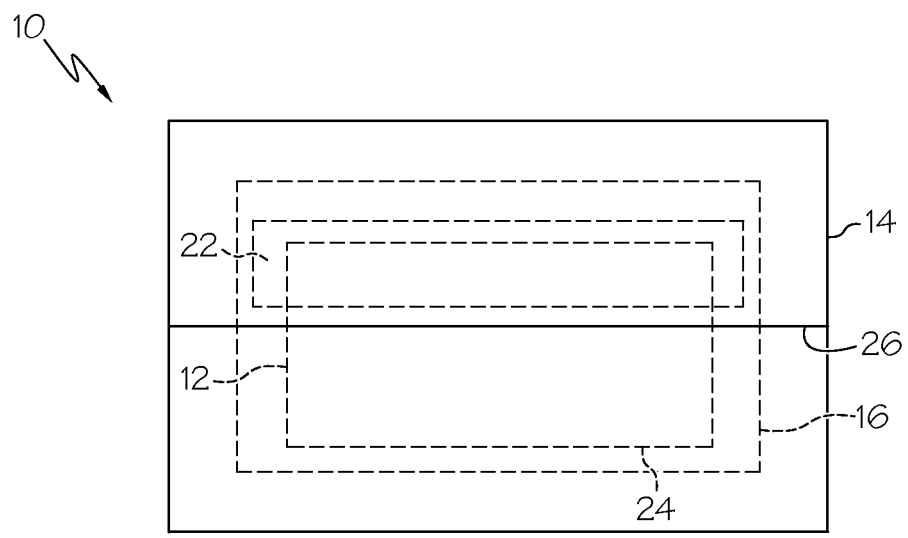
FIG. 9B is a front planar view of the combined gift card and envelope of FIG. 9A shown in closed configuration.
Figure 10:
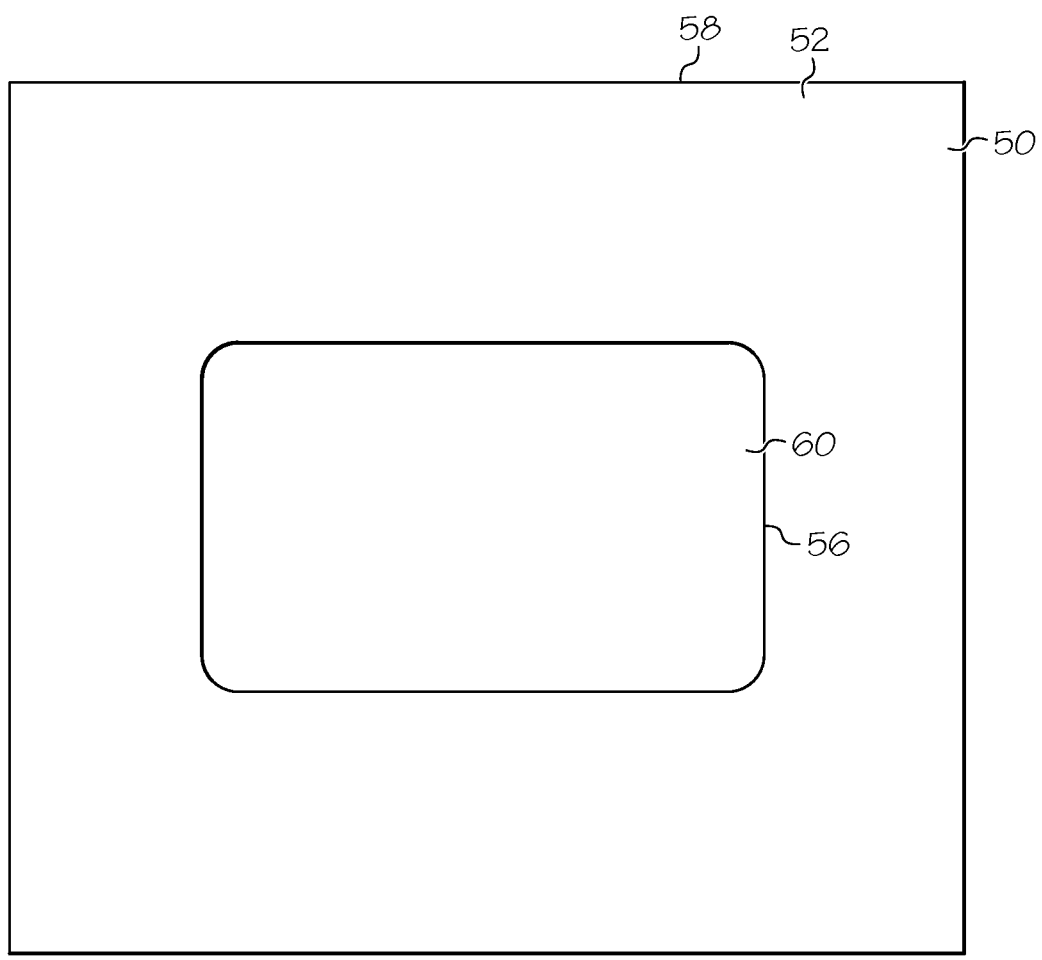
FIG. 10 is a front planar view of a physical configuration of the gift card and a greeting card, according to an embodiment of the present invention.
Figure 11:
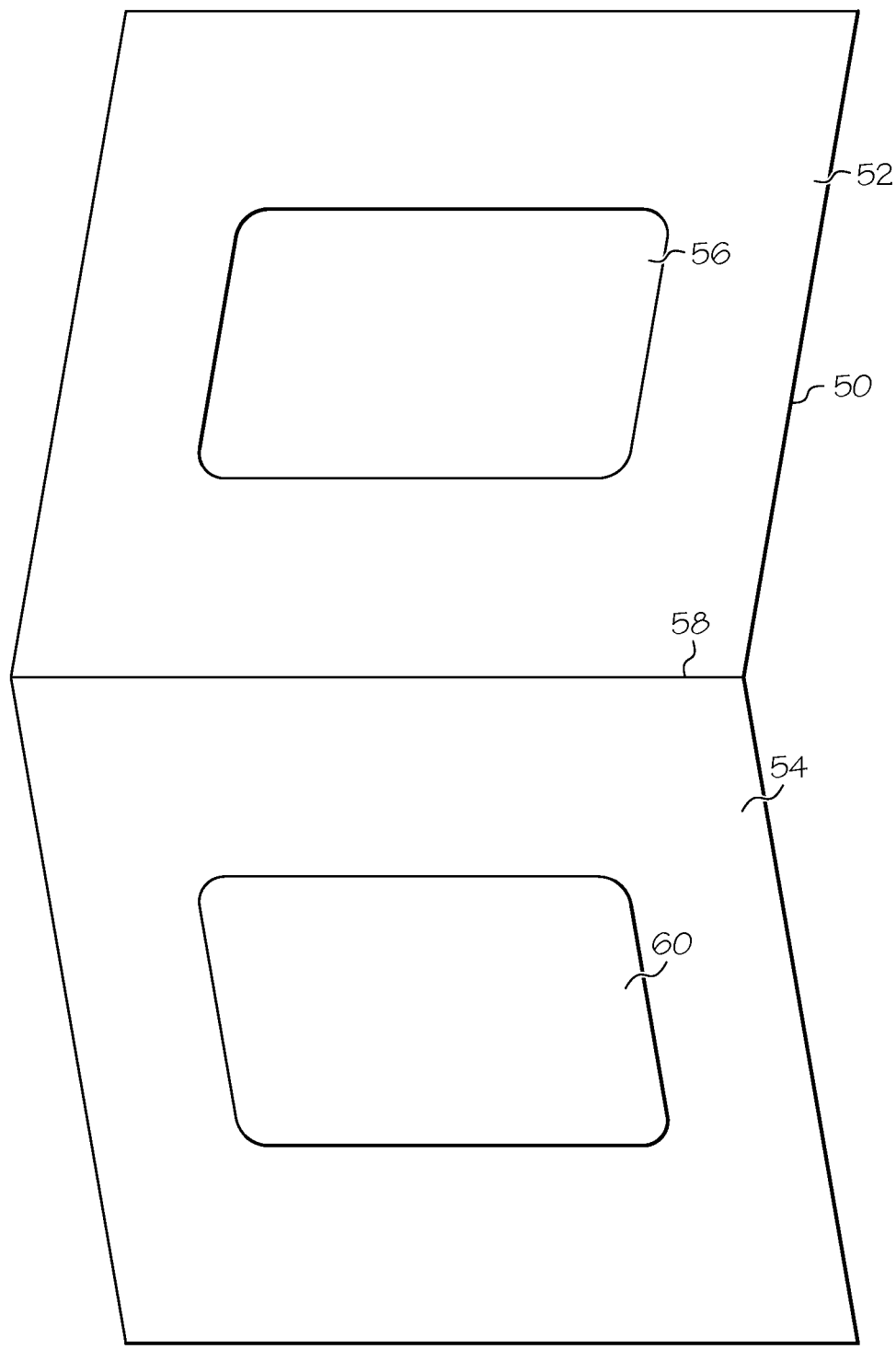
FIG. 11 is a perspective view of the greeting card of FIG. 10 being opened with the gift card attached.

In one exemplary embodiment, the gift card can be a paper card. The paper gift card may 12 be a closed-end mailer that includes a combined envelope 14 to which the card 12 is connected for mailing by the gift giver to the recipient. The combined gift card and envelope 10 can be a single unitary piece and may also include a separate brochure 16 as shown in FIGS. 9A and 9B. The envelope 14 may include a bar code to enable tracking by the card issuer of the individuals to whom each gift card is sent, particularly when the gift cards are distributed unsolicited inside magazines, attached to packaging, or by broadcast mass-mailings or emails. The brochure 16 can be used to provide directions to the gift giver concerning how to fund the gift card or directions to the recipient regarding how to redeem the card. In another embodiment, the brochure 16 can include advertising information related to other products or services sold or provided by the card issuer, retailer, or manufacturer.

In another embodiment, the gift card may also include a portion that is a greeting card or, in another alternate embodiment, the gift card can be a greeting card that includes a unique card identifier, e.g., a hex number or a gift card number, that permits the card to be funded securely by the gift giver and securely activated and redeemed by the intended recipient.

The paper gift card can be in the form of a coupon or as part of a packaged envelope, card, and advertising information that can be mass-distributed by mail either randomly or through targeted mailings to specific individuals or households. The coupon version of the gift card can include a card number to permit funding of the card by the gift giver and activation of the card by the recipient at a retail location or online through the card issuer's website. The gift card can be used and delivered to a gift giver as a stand-alone brochure, a package insert, or a direct mail piece. In another embodiment, the paper gift card can be inserted unattached or bound into a magazine, catalog, newspaper or other publication that is will be purchased or viewed by individuals of unknown identity. In still another embodiment, the gift card can be predictive in nature, for example, where the card issuer obtains information from retailers or another source related to an individual's contact information and shopping preferences to distribute the card to a targeted set of individuals.

As shown in FIG. 9A, the paper gift card 12 can be connected to a tongue 18 of an envelope 14 that can be delivered via mail or other delivery means. The envelope 14 can be oriented in an open configuration so that contents of the envelope such as, for example, the gift card 12, gift card instructions, a catalog, a brochure 16, or a greeting card, can be accessed by the recipient. The envelope 14 can also be oriented in a closed configuration to enclose or seal the contents inside the envelope as shown in FIG. 9B. The gift card 12 can be detachably connected to an inner surface 20 of the envelope's tongue 18 by an adhesive 22. The gift card 12 may have an affixed portion attached to the envelope tongue 18 by the adhesive 22 or other attachment means. The gift card and affixed portion may be separated by a perforation that permits the gift card to be detached from the affixed portion by tearing. The gift card 12 can be sized and attached to the inner surface 20 of the envelope tongue 18 in such a way that a top edge 24 of the gift card may extend further than and hang beneath a bottom edge 26 of the envelope tongue 18. The gift card 12 can be inserted into a pouch 28 (or interior space) of the envelope 14 when the envelope is oriented in the closed configuration. When the envelope tongue 18 is grasped and opened by the gift giver, the gift card is pulled out of the pouch 28 of the envelope 14 so as to be visible to the user.

The gift card 12 may further include space 30 to write or print the gift recipient's name. Once the gift giver has detached the gift card 12 from the affixed portion 22, the gift giver may insert the gift card 12 into the pouch 28 of the envelope 14 and then seal the envelope in a sealed configuration for delivery to the gift recipient.

In another embodiment, the gift card can be detachably connected to the envelope via perforations. The gift card can remain entirely or partially exposed outside of the envelope's pouch when the envelope is oriented in the closed configuration so as to be visible. When the envelope tongue is oriented in the closed configuration, the gift card can still be visible to the user because the gift card may protrude from and hang beneath a bottom edge of the envelope tongue. After the gift card has been activated and funded, the gift giver can detach the gift card from the bottom edge of the envelope tongue and insert the card into the envelope which can be sealed in the closed configuration for delivery to the gift recipient.

In another embodiment, the envelope tongue can further include a detachable portion or stub connected to a bottom edge of the tongue. The detachable portion can include an image or description of the gift item purchased by the gift giver and redeemable by the gift recipient using the gift card enclosed within the envelope. The detachable portion may be detached by the gift giver and discarded or detached and retained by the gift giver as a record of the gift item purchased for the gift recipient.

In one embodiment, the paper gift card can be attached to a box, for example, to the top of a pizza box, or to other packaging in which a product is delivered to consumers. The paper gift card can be attached to the box or other packaging by a magna-strip or other resins or glues, although any suitable attachment means may be used for the purpose. Magna-strips may also be utilized to attach the gift card inside, on, and to magazines and other publications.

In another embodiment, the gifting system may use a multi-pack, which can be a package or envelope containing multiple gift cards for a plurality of products or services or from a plurality of retailers or manufacturers. The multi-pack can be delivered to the consumer, e.g., by direct mail, so that the consumer can browse the gift cards and select one or more to activate and fund for gifting to a gift recipient. The gift giver's opportunity to select one or more gift cards for activation and gifting to a recipient from among the plurality of gift cards contained by the multi-pack provides a type of "gift card mall" experience that is delivered directly to the gift giver's home. The gift giver can select a gift from among the gift representations provided in the multi-pack and activate and fund the gift card via the website from a location and computer that is convenient for the gift giver. The multi-pack can be mailed to a consumer upon the consumer's request or can be mailed to a group of consumers whose contact information is obtained from a mailing list compiled or acquired by the card issuer or advertiser.

The multi-pack and the plurality of individually unique gift cards contained therein can be manufactured using a single stream in-line process, by a sheet-fed operation, manually, or by any other suitable printing and folding means. To efficiently create the multi-pack, a variable printing machine may be used to print unique cards sequentially via inkjet printing means. The sequential printing feature of the printer allows a single set of a plurality of unique gift cards, e.g., gift cards for a plurality of different gifts or from a plurality of different retailers or manufacturers, to be printed as one sequential set that can be packaged together rather than requiring printing and subsequent collation of the different cards. The gift cards can be variably printed so that each card differs in the name of the consumer, the gift representation, the retailer, or the manufacturer printed on each card in the set that is to be packaged. In this way, each consumer can receive a multi-pack that is individually personalized for the specific user and which can contain gift cards that are the same as or different from those contained in any other multi-pack. Personalization of each multi-pack for each specific user can be accomplished using personal information contained in a database related to each user. The printing machine can collate the cards automatically rather than requiring each set of identical gift cards to be separately printed and subsequently collated by manual or mechanical means. In one embodiment, the multi-pack may also contain one or more mailable greeting cards and envelopes in addition to the plurality of gift cards. In another embodiment, the multi-pack can be made available for pick-up by gift givers in a retail location. Each gift card in the multi-pack may include a unique hexadecimal number, standard gift card number, and/or bar code printed thereon. Other information can also be printed on each unique gift card within the multi-pack to further personalize the gift card such as, for example, the gift giver's name and address, the product name or product image, and product information. Similar personalized data can be printed on the greeting card in embodiments in which the multi-pack contains one or more greeting cards.

In another exemplary embodiment, the gift card can be digital or electronic/virtual. For example, the gift card may take the form of an email that includes a unique card identifier. The email may be printable so that once sent by the gift giver to the recipient, the recipient may receive, print, and use the gift card to make a purchase. The electronic gift card may be designed by the gift giver using design features available on the website. For example, the website may permit the gift giver to include a photograph of the gift giver on the gift card.

The gift card may be transferrable between physical and virtual form. For example, a gift card recipient may use a web-based interface to convert his or her physical gift card into an electronic or virtual form. The gift card recipient may also navigate the same web-based interface to print a physical copy of the gift card. Alternatively, the recipient may order a physical gift card to be sent to him via mail, reactivate a physical gift card that had been transferred to virtual form, transfer a virtual gift card to physical form at a retail outlet, or otherwise transfer forms.

In another embodiment, as illustrated in FIGS. 10-13, an alternate configuration of the greeting card 50, gift card 60, and optionally envelope 70 is provided. Referring to FIGS. 10-13, a greeting card 50 may be provided with a top portion 52 and a bottom portion 54, which may be attached at a crease edge 58. The top portion 52 and bottom portion 54 of the greeting card 50 may be formed using one monolithic piece of material, such as paper, which is folded to form the crease edge. Alternatively, the top and bottom portions 52, 54 may be formed as separate portions and then later be operatively fixed to one another at the crease edge 58. A window 56 may be included in the top portion 52 of the greeting card 50. The window 56 may be an area of removed material from the top portion 52 of the greeting card 50. Light may pass through the window 56, revealing the contents of the greeting card 50 by looking through the window 56. In the example presented by FIG. 10, a gift card 60 may visible through the window 56 when the greeting card 50 is in the closed configuration.

In one embodiment, the window 56 may be located approximately centrally on the top portion 52 of the greeting card 50. However, skilled artisans will appreciate additional positions on the greeting card 50 at which the window 56 may be located. In additional embodiments, multiple windows 56 may be included of various shapes and sizes.

A gift card 60 may be included on an inner surface of the bottom portion 54 of the greeting card 50. The gift card 60 may be formed using paper, plastic, and/or other materials, as discussed additionally within this application. As perhaps best illustrated in FIG. 11, the gift card 60 may be temporarily attached to the surface of the gift card 50, for example, using a removable adhesive. Alternatively, the gift card 60 may be printed on the greeting card 50 and may be removed via perforated edges. The gift card 60 may be positioned on the bottom portion 54 of the greeting card 50 in an approximately centered location. Optimally, the gift card 60 may be positioned to allow it to be viewed through the window 56 with the greeting card 50 closed. As discussed above, the gift card 60 may include information such as a unique identifier or hexadecimal number, sender, recipient, value, or other information.

Figure 12:
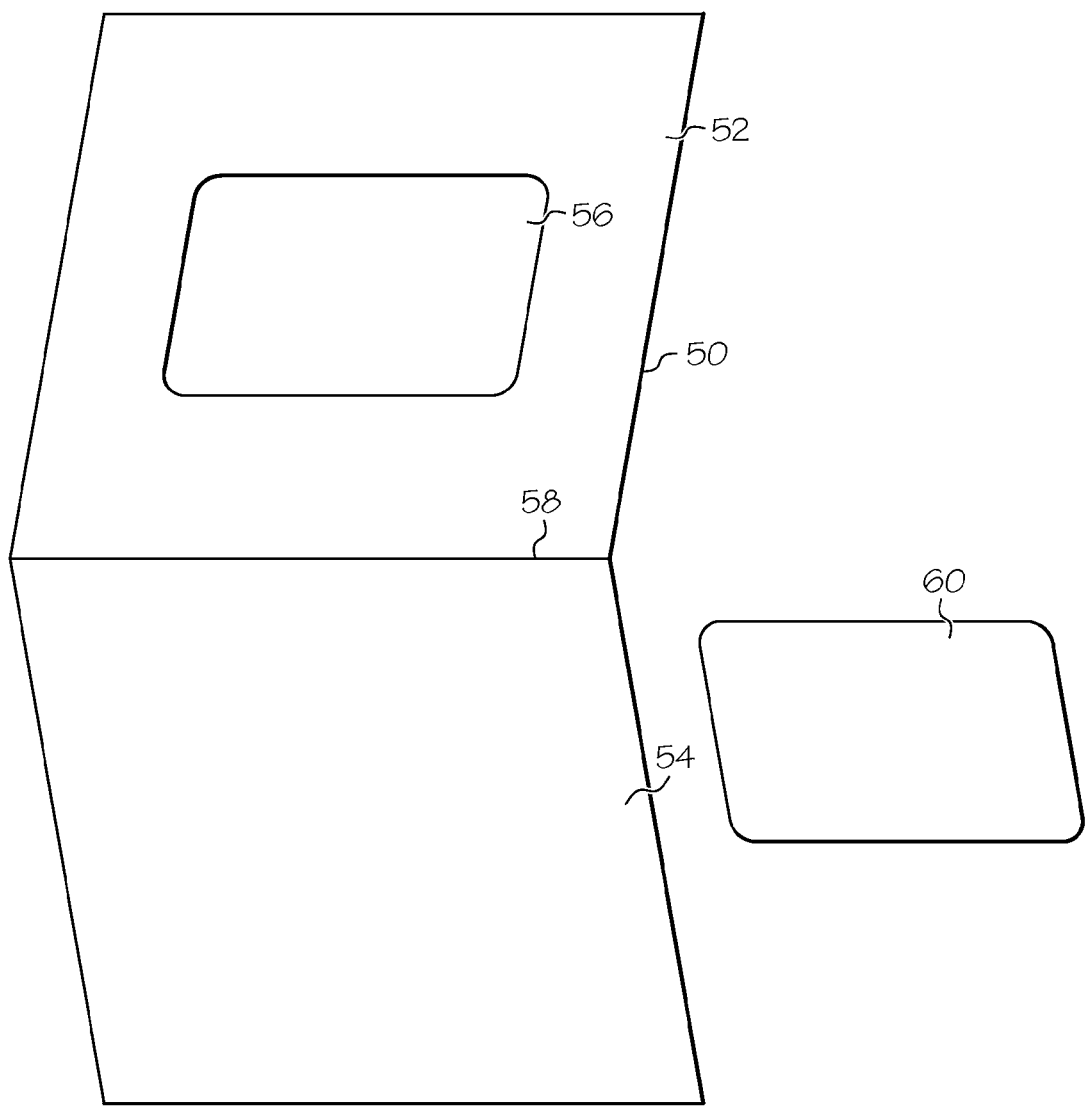
FIG. 12 is a perspective view of the greeting card of FIG. 10 being opened with the gift card detached.

As perhaps best illustrated in FIG. 12, the gift card 60 may be removed from the greeting card 50. For example, the gift card 60 may be lifted from the surface of the greeting card 50 to break the bond of the temporary adhesive. The gift card 60 can then be used in physical form, or as a physical gift card 60 at any designated retail location. Alternatively, the gift card 60 may be converted into virtual form, or as a virtual gift card. Additionally, the integrity of the greeting card 50 may be maintained, which may then be displayed or kept by the recipient.

Figure 13:
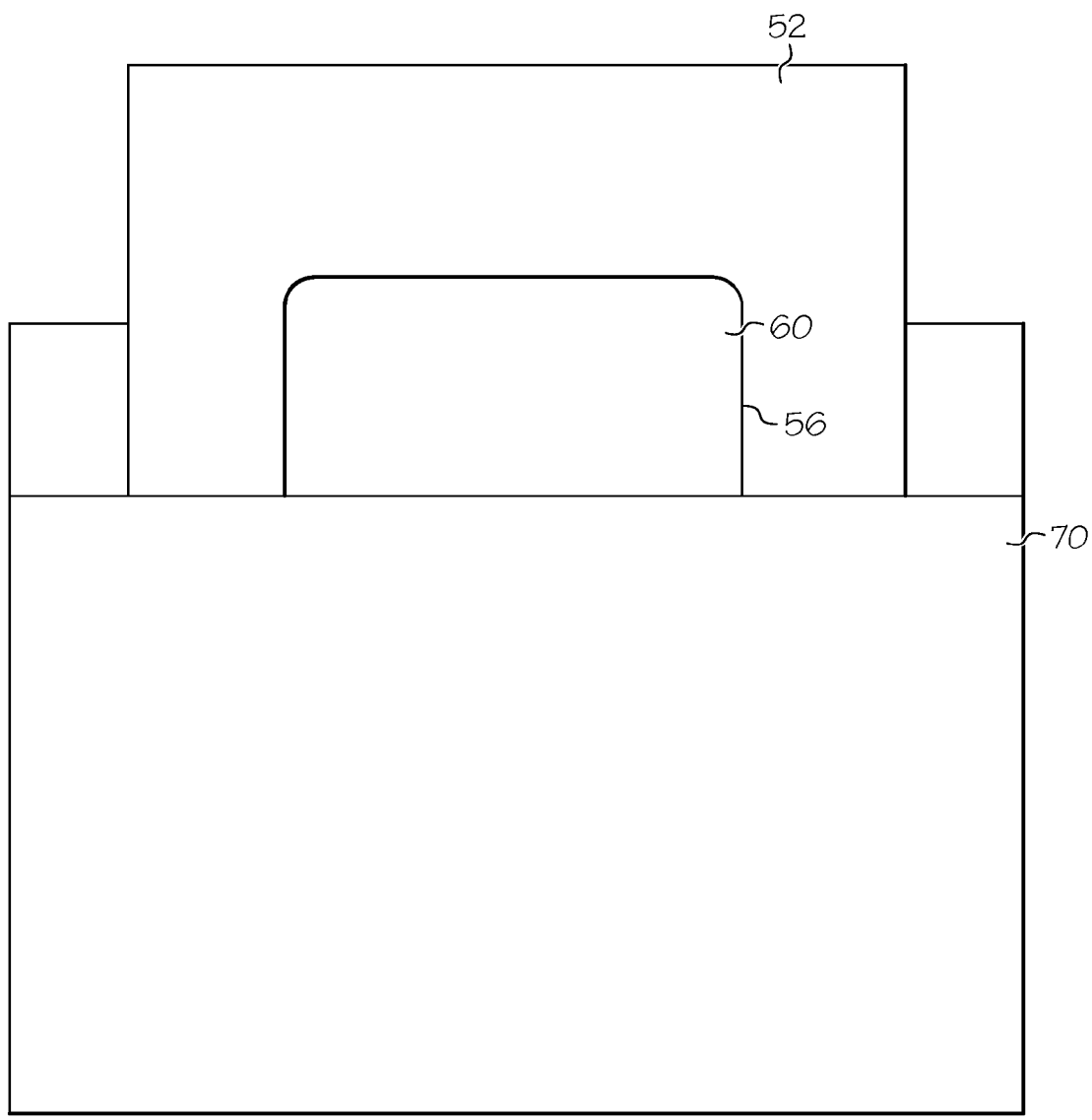
FIG. 13 is a front planar view of the greeting card and gift card of FIG. 10 being partially located within an envelope.

As perhaps best illustrated in FIG. 13, the greeting card 50 and/or gift card 60 may be inserted into an envelope 70 to create a gift card package. The envelope 70 may then be addressed and sent to a gift recipient. The envelope 70 may include additional features, which have been discussed throughout this disclosure.

As shown in FIGS. 1-5, 6A-6C, and 7-8, the invention also features a method in which a gift giver creates and logs into an account on a card issuer's website and accesses account features on the website that enable the gift giver to order, personalize, fund, address, and send a personalized gift card to a recipient. Once the gift card has been purchased, the website may generate a receipt, which can be an animation, to notify the gift giver that the purchase transaction has been completed and that the gift card will be delivered to the recipient. The receipt may be delivered to the gift giver in an email. Upon receipt of the gift card, which may be a printed paper gift card that is mailed or otherwise delivered or an electronic gift card (or e-gift card or e-card) that is emailed or otherwise electronically transmitted to the recipient, the recipient can redeem the gift card by accessing the card issuer's website and following instructions provided therein to activate the card. In another embodiment, the recipient can activate the card via a telephone system of the card issuer.

In embodiments utilizing the e-gift card, the e-gift card may include a link to an advertisement for the gift item or for other products or services sold by the gift item's retailer. In another embodiment, the advertisement may be attached to the e-gift card as a separate file, which can be a multimedia file.

As shown in FIG. 1, the gift giver may register for access to the website, and once registration is completed, may receive a log-in or username as well as a personal identification number (pin) or password to access the website. Personal information entered by the gift giver during registration can be saved on a remote server maintained or controlled by the card issuer. The gift giver may choose a gift to be purchased and given to the recipient as a gift card that can be redeemed online or at a retail store. To send a gift card to the recipient, the gift giver must enter personal information related to the recipient, which can also be stored on the remote server. The website may generate a password that can be provided to the recipient to activate the gift card online, by telephone, or at a retail store to redeem the gift card for the gift. In another embodiment, users can access the website without being required to use a password.

In another embodiment, the method includes a step wherein the recipient must also register for access to the website, thereby providing certain personal information, to activate the gift card. Once the recipient has registered and logged in to the website, the recipient may activate the card to redeem the gift. If the recipient accepts the gift, acceptance confirmation may be provided. Shipping confirmation may also be provided via the website, email, or mail where the gift is to be shipped to the recipient rather than received at a retail store.

The website may include an avatar created from software that generates a human voice to orally describe the products being advertised, provide instructions, greet the individual accessing the website, provide gift card delivery status, or provide information pertaining to points or rewards earned through use of the card issuer's website. The avatar and its related software can provide dynamic personalization to user account accessible via the website by communicatively linking the avatar software to a database stored on a server. The database can include user information such as, for example, the user's name, address, birth date, anniversary date, and other personal information that is associated specifically with the user. The system can include a voice engine that operates text-to-speech software and converts text entered into the system and preselected user information obtained by the avatar software from the database into an audio file that sounds similar to or mimics a human voice. The avatar's speech can include reading or playing aloud the website user's name as part of a greeting message to the user. In another example, the audio file which appears to be spoken by the avatar can include a birthday greeting message on or around the time of the user's birth date.

In one embodiment, the system may use data related to the user's shopping interests and previous purchases to suggest gifts through information "read" aloud by the avatar. For example, if the user/gift giver is shopping on or around the time of Mother's Day, the system by means of the avatar speech can recommend a gift to the gift giver similar to the gift that the gift giver purchased for the gift recipient the previous year. In another embodiment, the system's avatar may recommend a variety of gifts for purchase by the gift giver which are appropriate for the occasion. For example, if the gift giver is shopping on the website for a female gift recipient's birthday gift, the avatar may "read" descriptions of one or more gift items such as, for example, jewelry or women's perfume. In this way, the appearance and content of the website's web pages and content can be customized to be predictive based upon the user's history and habits recorded by the system during the user's previous visits to the website.

If the gift giver has selected a particular gift for the recipient, which can be indicated in information provided on the gift card, and if the recipient desires a different gift than the one selected by the gift giver, the recipient may choose a different gift of the same or a lesser value by accessing the card issuer's website and following instructions provided therein for changing the gift selection.

In another embodiment where the card issuer is a brick-and-mortar retailer, the recipient may redeem the card to receive the gift by visiting one of the retailer's store locations. The card issuer may use the website to specify locations of one or more brick-and-mortar stores located in a geographic area. The card issuer may also associate one or more tags to increase a likelihood that the store is returned in a search request for a product or service provided by that store.

The invention also relates to a method for gifting and advertising. In one step of the method, when the recipient accesses the card issuer's website to activate the gift card, the recipient will have the option to send a thank you message, which can be delivered via email, to the gift giver.

In one embodiment of the method, the website may be customized to have a different appearance or to contain different content, for example, advertising content, for each gift giver and recipient that accesses the website. Advertisements on the website can be linked or hosted.

The invention also relates to a method of gifting that can include the use of a unique card identifier that can be an alphanumeric identifier such as, for example, a hexadecimal number, stock keeping unit (SKU), or standard gift card number (e.g., a standard sixteen-digit gift card number), or the unique card identifier can be a bar code having any of the aforementioned identifiers encoded thereon. The method can include the step of providing a printed material including a plurality of gift representations each representing an actual gift item. A unique printed alphanumeric identifier stored on a server can be assigned to each of the plurality of gift items represented by the plurality of gift representations. The method can be used to associate tracking data with each alphanumeric identifier. The method can also provide a website that is connected to the server via a communications network by which a user can purchase at least one gift item selected from among the plurality of gift representations appearing in the printed material. The user can be required to enter the alphanumeric identifier assigned to the selected gift item into a graphical user interface of the website. The method can also require the user to provide personal information through the graphical user interface of the website. The alphanumeric identifier can be associated with the user, e.g., in a database in which alphanumeric identifiers are each associated with one of a plurality of users.

Where a hexadecimal number or SKU is used, the method may include the step of converting the alphanumeric identifier into a standard sixteen-digit gift card number that is acceptable at POS terminals in retail locations.

The method can also include the step of analyzing the tracking data, personal information, browsing habits, and shopping habits of the user collected during the user's access to the website to determine the user's predicted shopping preferences. Advertisements may be presented to the user based upon the user's predicted shopping preferences.

The method may include the step of purchasing a gift item through the website to be gifted by the user to a gift recipient, wherein the user is a gift giver. Another step of the method can include delivering a gift card to the gift recipient. The gift card can feature a gift representation of the actual gift item selected and purchased by the gift giver. The gift card may be redeemed for the actual gift item by the gift recipient providing the gift recipient's personal information through the graphical user interface of the website.

The method can be used to record data related to the shopping and purchasing activities of the gift giver and gift recipient accessing the website. Using the recorded data, gift items can be suggested to the gift giver for purchase by the gift giver during the gift giver's subsequent visits to the website based upon the gift giver's shopping and purchasing activity data during previous visits to the website. The gift recipient may redeem the gift card for the gift item selected and purchased for the gift recipient by the gift giver. Alternatively, the gift recipient may reject the gift item selected and purchased by the gift giver and to select a different gift item chosen by the gift recipient.

The invention also relates to a method that can be used to advertise and promote retail goods and services through gifting. Once the user, e.g., a consumer, a gift giver or a gift recipient, has accessed the system website, the user may elect to play and view an advertisement, which features information related to a retail item. The retail item can be a good or a service. Through the website, the user can then be asked or presented with a series of questions related to the retail item. The user can be awarded points based upon the number of questions answered correctly by the user. The user may then redeem the points awarded by the system for a reward item. The reward item can be a downloadable movie, a downloadable song file, a downloadable audiobook, a pay-per-view movie, a downloadable image file, a downloadable computer screen saver, a downloadable video file, or a movie rental voucher. The method can permit a gift giver to gift points earned or a reward item selected by the gift giver to a gift recipient.

In another step of the method, when gift givers and recipients access the card issuer's website they may be shown advertisements and other marketing information provided by the card issuer, retailers, and/or manufacturers. The advertising information may be provided as video and/or audio presentations, still photographs, and/or text advertisements. The advertising information can also be provided through games in which the gift giver or recipient answers questions to earn points that are redeemable for rewards. Where the website is operated by a third party and not by one or more retailers or manufacturers, the retailer and/or manufacturer may pay for the rewards earned by users of the website. The questions on the website may be directed to information about the retailer and/or manufacturer's products. Consumers can be rewarded or paid to watch advertisements. A consumer may earn reward points by watching advertisements on the website and answering questions about each advertisement correctly. The consumer may also be awarded points for making purchases through the website including gift card purchases. The number of points awarded may also be dependent upon another variable such as the number of seconds of advertising watched while the gift giver or recipient is accessing the website. Examples of rewards that may be earned through the game-like advertising on the website include streaming and downloadable movies that can be viewed online, pay-per-view movie credits, music downloads, gas credits, or any other suitable product or service. In one embodiment, the interactive gifting system permits the consumer to select the advertisements that he or she watches.

The method can include the step of using the system to record the number of correct and incorrect answers provided by the consumer. Other information such as, for example, information concerning the specific questions answered correctly or incorrectly by the consumer can also be recorded. In this way, more points may be awarded to the consumer for answering certain questions correctly than other questions. Because the method incorporates these data mining features that are recorded in association with the identity and personal information of a specific consumer, advertisers can receive more viable, and valuable, leads related to individuals to whom the advertiser should target its advertisements and promotions.

The method and systems related thereto are viral in that one consumer can refer another consumer to the website for the system. In one example, the referral is accomplished by a gift giver delivering a gift card to a gift recipient so that the recipient is directed to the website by instructions included with the gift card in order to redeem the gift. Once the recipient accesses the website, in addition to redeeming the gift card for a gift item, the recipient may also engage in game play of a commercial game, e.g., watching advertisements on the website and answering questions concerning those advertisements to earn reward points that are redeemable for a retail good or service. The method can also include steps in which a first consumer refers a second consumer to the website by emailing a link to the website, by word-of-mouth, or by submitting the second consumer's e-mail address or other contact information through the website to allow the system to generate an e-mail, direct mail, or other communication to the second consumer with information related to the game and reward point system.

Figure 14:
FIG. 14 is a diagram of a sheet including gift cards, according to an embodiment of the present invention.

Referring now to FIG. 14, an illustrative sheet including gift cards will be discussed. The sheet may include any number of gift cards, which may be arranged on the sheet in varying positions. The gift cards may be combined with advertisements. The gift cards may also serve a dual purpose of giving a gift and providing an advertisement. The gift cards and/or advertisements may be arranged to occupy approximately the full area of the sheet or a section of the sheet. For example, the gift card and/or advertisement may occupy ⅛, ⅙, ¼, ⅓, ½, ⅔, ¾, ⅚, or another sized portion of the sheet that would be apparent to a skilled artisan. One or more additional gift card and/or advertisement may occupy at least part of the remaining area of the sheet. The gift card and/or advertisement may include information regarding the gift or a vendor associated with the gift, for example, an address, phone number, gift identification number, barcode, scanning instructions, QR code, image, or other information.

Figure 15:
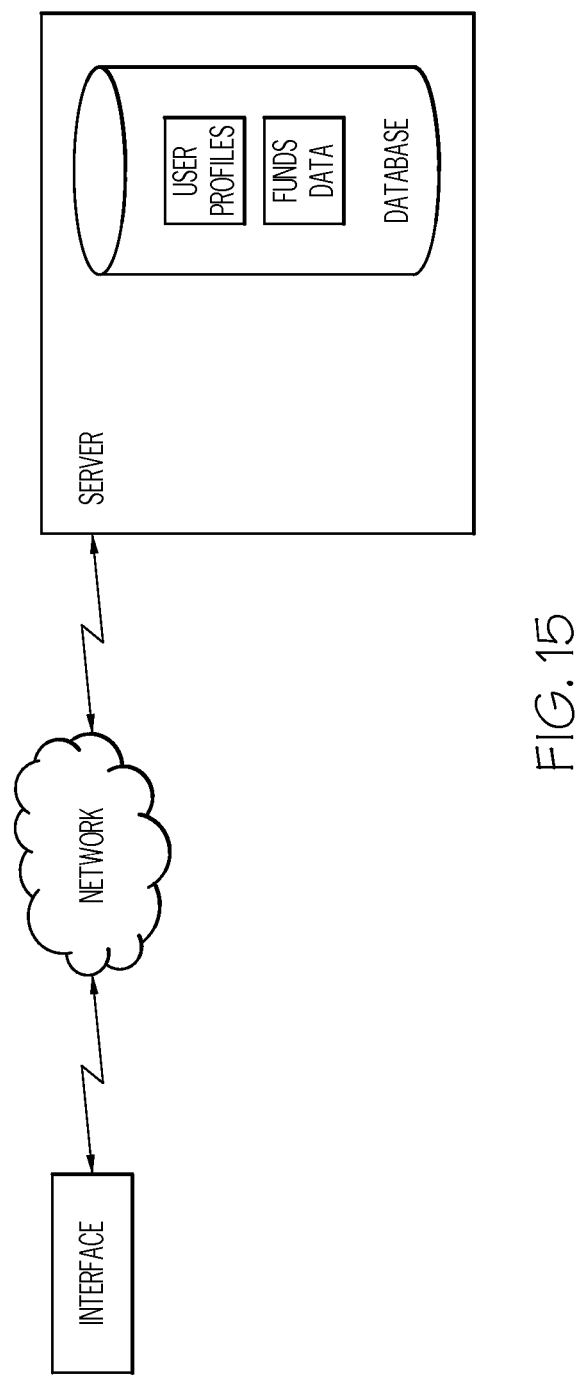
FIG. 15 is a block diagram illustrating connections with a remote server, according to an embodiment of the present invention.

Referring now to the block diagram of FIG. 15, an example connective structure of the system will be discussed. The system may include an interface, for example, a website. The interface may be connected to a remote server via a network, for example, the internet. The remote server may include a database. Alternatively, the server may be operatively connected to a remote database. The database may include information relating to operation of the system, for example, user profiles, funds data, and other information.

Figure 16:
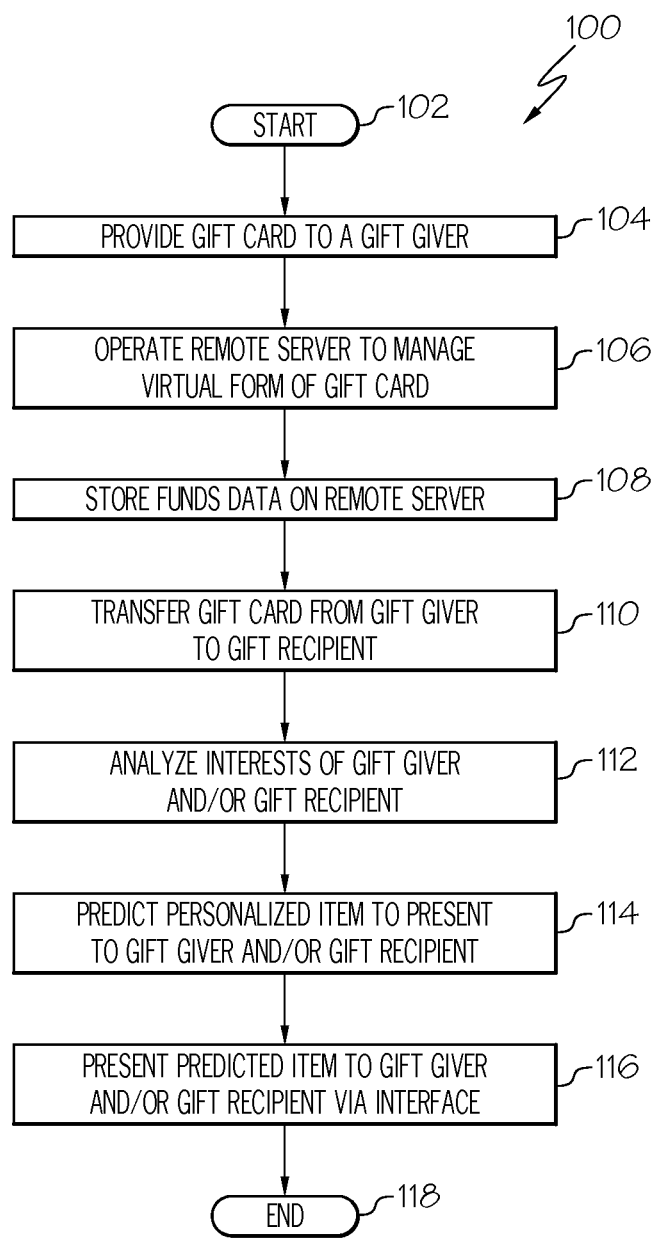
FIG. 16 is a flowchart illustrating a method of gifting, according to an embodiment of the present invention.

Referring now to flowchart 100 of FIG. 16, an illustrative method of gifting will be discussed. Starting at Block 102, the method may include providing a gift card to a gift giver. (Block 104). The gift card may be provided in physical form and/or virtual form. The physical form of the gift card may be delivered via physical delivery. The virtual form may be accessed on a computing device comprising a connection to a communications network.

The method may additionally include operating a remote server accessible via the communications network to manage the virtual form. (Block 106). Funds data associated with the gift card may be stored on the remote server that relates to funds transferred by the gift giver to a card issuer. (Block 108). The gift card may then be transferred from the gift giver to a gift recipient, the gift card in the physical form being transferrable via physical delivery and the gift card in the virtual form being transferrable via an electronic communication. (Block 110). As discussed above, types of electronic communications through which a gift card may be distributed may include email, websites, facsimile, text message, social networking websites, web publishing services, blogs, electronic bulletin boards, advertisements, video conferences, newsgroups, chat rooms, instant messaging, video sharing services, and/or other types of electronic communications that would be apparent after having the benefit of this disclosure.

Interests of the gift card giver and/or the gift card recipient may be analyzed. (Block 112). The analysis may be performed using software and/or a computerized device. The analysis may be used to predictively select a personalized item for presentation to at least one receiving party based upon data in a gift giver data profile or a gift recipient data profile. (Block 114). At least one receiving party may have an increased likelihood of interest in the predictively selected personalized item. The receiving party may be the gift giver, the gift recipient, or both. The predicted item may then be presented to the gift giver and/or gift recipient via an interface. (Block 116). The operation may then terminate at Block 118.

Additional aspects may be included with the above discussed method of gifting. For example, the step of Block 106 may include recording data relating to use of the remote server for analysis to predict goods or services to advertise and promote to the receiving party. The system may determine that the receiving party could be interested in a good and/or service based upon marketing analysis. Additionally, gift giving may further include analyzing the data and presenting an advertisement to a user of the remote server based on the analysis of the data. A unique identifier may be associated with the gift card that is shared between the physical form and the virtual form. The remote server may be accessible via a website. Additionally, the operation of Block 110 may include attaching the gift card that is not activated to an article, selling the article, and activating the gift card via the remote server.

Figure 17:
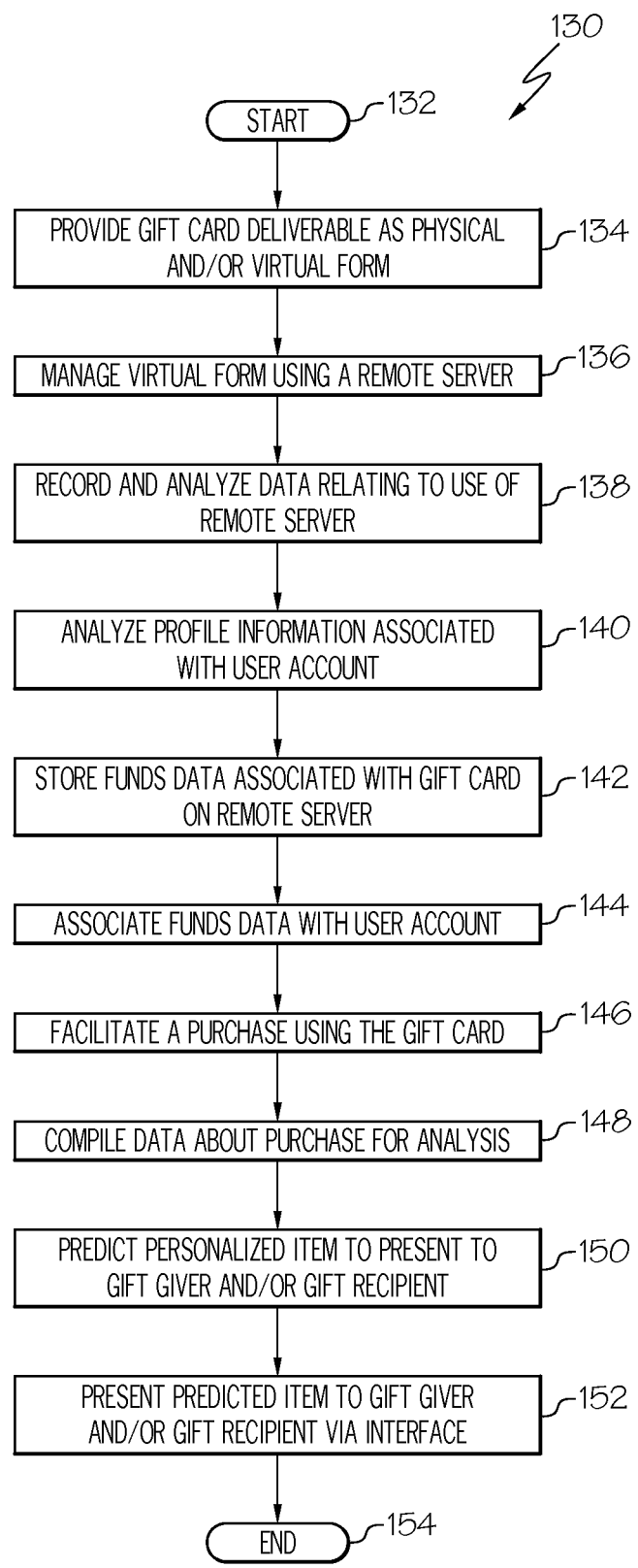
FIG. 17 is a flowchart illustrating a method of gifting and advertising, according ton an embodiment of the present invention.

Referring now to flowchart 130 of FIG. 17, a method of gifting and advertising will be discussed. Starting at Block 132, a gift card may be provided as a physical and/or virtual form. (Block 134). The gift card in physical form may be deliverable via physical delivery. The gift card in virtual form may be accessible on a computing device comprising a connection to a communications network. The physical form and the virtual form each have a common shared unique identifier. The remote server may be accessed and operated via the communications network to manage the virtual form. (Block 136).

Data may be recorded relating to use of the remote server by users for analysis (Block 138). The users may include a gift giver and/or a gift recipient. Each new user may be allowed to register for access to the remote server via a website by creating a user account and password. The data may be analyzed to create a demographic profile of each user. (Block 140). Each user's demographic profile may be associated with the user's user account. Funds data associated with the gift card may be stored on the remote server that relates to funds transferred by a gift giver to a card issuer. (Block 142). The funds data may be associated with the user account of a gift recipient. The gift card may be transferred from the gift giver to the gift recipient, the gift card in the physical form being transferrable via physical delivery and the gift card in the virtual form being transferrable via an electronic communication. The gift recipient may be permitted to purchase a good and/or service using the funds associated with the gift card.

The method may include associating the good and/or service purchased by the gift recipient with the unique identifier. (Block 144). Additionally, making a purchase using the gift card may be facilitated by the system. (Block 146). Data may be complied based on the gift recipient's purchased good and/or service and the gift recipient's potential interest data that is associated with the gift recipient's user account. (Block 148). The system may then predict a personalized item to present to the gift giver and/or gift recipient. (Block 150). The personalized item may be presented to at least one user of the remote server based upon the user's predicted interests in goods and services as determined from the user's demographic profile, which may be associated with the user's user account. (Block 152). The personalized item may include an advertisement, a product recommendation, a service recommendation, content, or another item that would be appreciated by a skilled artisan. The operation may then terminate at Block 154.

The illustrative method of flowchart 130 may additionally include, without limitation, a gift card that is one-sided or two-sided. Account-related information and the unique identifier may be printed or imprinted on only one side of the gift card or on two sides of the gift card. The interface may include a website, which may include one or more goods and/or services from which the user may select to make a purchase. In some instances, for this and other embodiments, the gift recipient may be the same person as the gift giver.

OTHER EMBODIMENTS

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A method for creating a customized online shopping experience for a customer, the method comprising the steps of:
    (a) providing a gift card to a gift giver of unknown identity, wherein the gift card is provided in physical form, virtual form, or both, the physical form being deliverable via physical delivery and the virtual form being accessible on a first computing device comprising a connection to a communications network;
    (b) operating a remote server accessible via the communications network to manage the virtual form;
    (c) to activate the gift card for a first activation before transferring funds to a card issuer and to create a gift card account associated with the gift card to receive funds transferred by the gift giver into the gift card account in association with the gift card, requiring the gift giver of unknown identity to submit (i) the gift giver's name so that the gift giver's identity becomes known, (ii) at least one gift giver personal information item, (iii) the name of a gift recipient, and (iv) at least one gift recipient personal information item;
    (c) storing funds data associated with the gift card on the remote server that relates to funds transferred by the gift giver to the card issuer;
    (d) transferring the gift card from to the gift giver to the gift recipient, the gift card in the physical form being transferrable via physical delivery and the gift card in the virtual form being transferrable via an electronic communication;
    (e) optionally, requiring the gift recipient to activate the gift card for a second activation before making a purchase using the gift card, wherein the second activation is performed by submitting (i) the gift recipient's name and (ii) at least one gift recipient personal information item;
    (f) making a purchase of a good or service by the gift recipient using either the physical form of the gift card or the virtual form of the gift card; and
    (g) analyzing the at least one gift giver personal information item, the at least one gift recipient personal information item, or both to compile data about the gift giver, the gift recipient, or both into a gift giver data profile, a gift recipient date profile, or both, respectively.

2. The method of claim 1, further comprising at least one step selected from the group consisting of:
    (h) using software to predictively select a personalized item for presentation to the gift giver based upon data in the gift giver data profile, wherein the gift giver has an increased likelihood of interest in the predictively selected personalized item; and
    (i) using software to predictively select a personalized item for presentation to the gift recipient based upon data in the gift recipient data profile, wherein the gift recipient has an increased likelihood of interest in the predictively selected personalized item.

3. The method of claim 2, wherein the personalized item comprises at least one item selected from the group consisting of: an advertisement, a product recommendation, a service recommendation, and content.

4. The method of claim 3, wherein the personalized item comprises a physical form that is delivered by physical delivery, a virtual form that is delivered electronically, or both.

5. The method of claim 1, wherein the physical form of the gift card is temporarily attachable to a greeting card.

6. The method of claim 1, wherein the virtual form of the gift card is incorporated in an electronically transmitted virtual greeting card that permits the gift recipient to access the virtual form of the gift card from the first computing device or another computing device comprising a connection to the communications network.

7. The method of claim 6, wherein the virtual form of the gift card is usable to make the purchase via electronic means via a website or by printing a physical copy of the virtual form of the gift card for exchanging for the good or service at a physical retail store.

8. The method of claim 1, further comprising the step of:
   (j) providing a website accessible via the first computing device or another computing device comprising a connection to the communications network, wherein the website features goods, services, or both available for purchase by the gift recipient using the gift card.

9. The method of claim 1, further comprising at least one step selected from the group consisting of:
   (k) customizing the website for the gift giver by displaying an advertisement, a product recommendation, a service recommendation, or content predictively selected for the gift giver by software based on the gift giver's expressed or predicted personal interests determined from data in the gift giver data profile; and
   (l) customizing the website for the gift recipient by displaying an advertisement, a product recommendation, a service recommendation, or content predictively selected for the gift recipient by software based on the gift recipient's expressed or predicted personal interests determined from data in the gift recipient data profile.

10. The method of claim 1, further comprising at least one step selected from the group consisting of:
   (m) before step (c), allowing the gift giver to create a user account and a password to access the user account; and
   (n) before step (e), allowing the gift recipient to create a user account and a password to access the user account.

11. The method of claim 10, wherein the gift card comprises a unique identifier that is associated with the user account of the gift giver, the user account of the gift recipient, or both.

12. The method of claim 1, further comprising at least one step selected from the steps of:
   (o) storing the data of the gift giver data profile in a first database of a system administrator and electronically comparing the gift giver data profile to data in a second database of a third party to match the gift giver's personal data across multiple platforms; and
   (p) storing the data of the gift recipient data profile in a first database of a system administrator and electronically comparing the gift recipient data profile to data in a second database of a third party to match the gift recipient's personal data across multiple platforms.

13. The method of claim 12, wherein the system administrator is an advertiser, a retailer, a manufacturer, a distributor, or a system service provider who provides services of the method to advertisers, retailers, manufacturers, distributors, or a combination of the foregoing; and wherein the third party is a different advertiser, a different retailer, a different manufacturer, a different distributor, or a different system service provider.

14. The method of claim 1, wherein the gift card is customizable by printing, imprinting, or electronic means by the gift giver.

* * * * *